(12) United States Patent
Sparks

(10) Patent No.: US 9,457,891 B2
(45) Date of Patent: Oct. 4, 2016

(54) SINGLE LEVER POWER CONTROL

(71) Applicant: HARLOW AEROSTRUCTURES LLC, Wichita, KS (US)

(72) Inventor: Dale Wayne Sparks, Wichita, KS (US)

(73) Assignee: HARLOW AEROSTRUCTURES LLC, Wichita, KS (US)

(*) Notice: Subject to any disclaimer, the term of this patent is extended or adjusted under 35 U.S.C. 154(b) by 29 days.

(21) Appl. No.: 14/551,788

(22) Filed: Nov. 24, 2014

(65) Prior Publication Data

US 2016/0144948 A1 May 26, 2016

(51) Int. Cl.
| | |
|---|---|
| *G05G 1/04* | (2006.01) |
| *G05G 9/10* | (2006.01) |
| *B64C 13/04* | (2006.01) |
| *B64D 31/04* | (2006.01) |

(52) U.S. Cl.
CPC .............. *B64C 13/04* (2013.01); *B64D 31/04* (2013.01); *G05G 1/04* (2013.01)

(58) Field of Classification Search
CPC ....... B64C 13/04; B64C 13/12; B64D 31/04; G05G 9/047; G05G 9/10; G05G 2009/04718; G05G 1/04; Y10T 74/20582
See application file for complete search history.

(56) References Cited

U.S. PATENT DOCUMENTS

| | | | | |
|---|---|---|---|---|
| 3,541,877 A | * | 11/1970 | Houk | B62D 11/08 180/333 |
| 5,107,080 A | * | 4/1992 | Rosen | B64C 13/04 200/6 A |
| 5,125,602 A | * | 6/1992 | Vauvelle | B64C 13/04 244/223 |
| 6,004,098 A | | 12/1999 | Chevallier et al. | |

OTHER PUBLICATIONS

Unison/ A Worldwide Leader in Aviation Technology; Las Vegas, NV—Oct. 21, 2013; http://www.unisonindustries.com/media-center/New-H-Series-Electronic . . . (1 page).
NASA Dryden News Releases—NASA Promotes Revolution in General Aviation Engines; Jul. 27, 2000; http://www.nasa.gov/centers/dryden/news/NewsReleases/2000/00-58_pf . . . (7 pages).

* cited by examiner

*Primary Examiner* — Adam D Rogers
(74) *Attorney, Agent, or Firm* — Loeb & Loeb LLP

(57) ABSTRACT

The example embodiments relate to a single lever system. In an example, the system may include a condition cable controlling mechanism configured for controlling adjustment of a condition cable, a power cable controlling mechanism configured for controlling adjustment of a power cable, and a single lever coupled to the condition cable controlling mechanism and to the power cable controlling mechanism. During manipulation of the single lever to control adjustment of the power cable, the condition cable controlling mechanism is configured to prevent adjustment of the condition cable. During manipulation of the single lever to control adjustment of the condition cable, the power cable controlling mechanism is configured to prevent adjustment of the power cable.

6 Claims, 52 Drawing Sheets

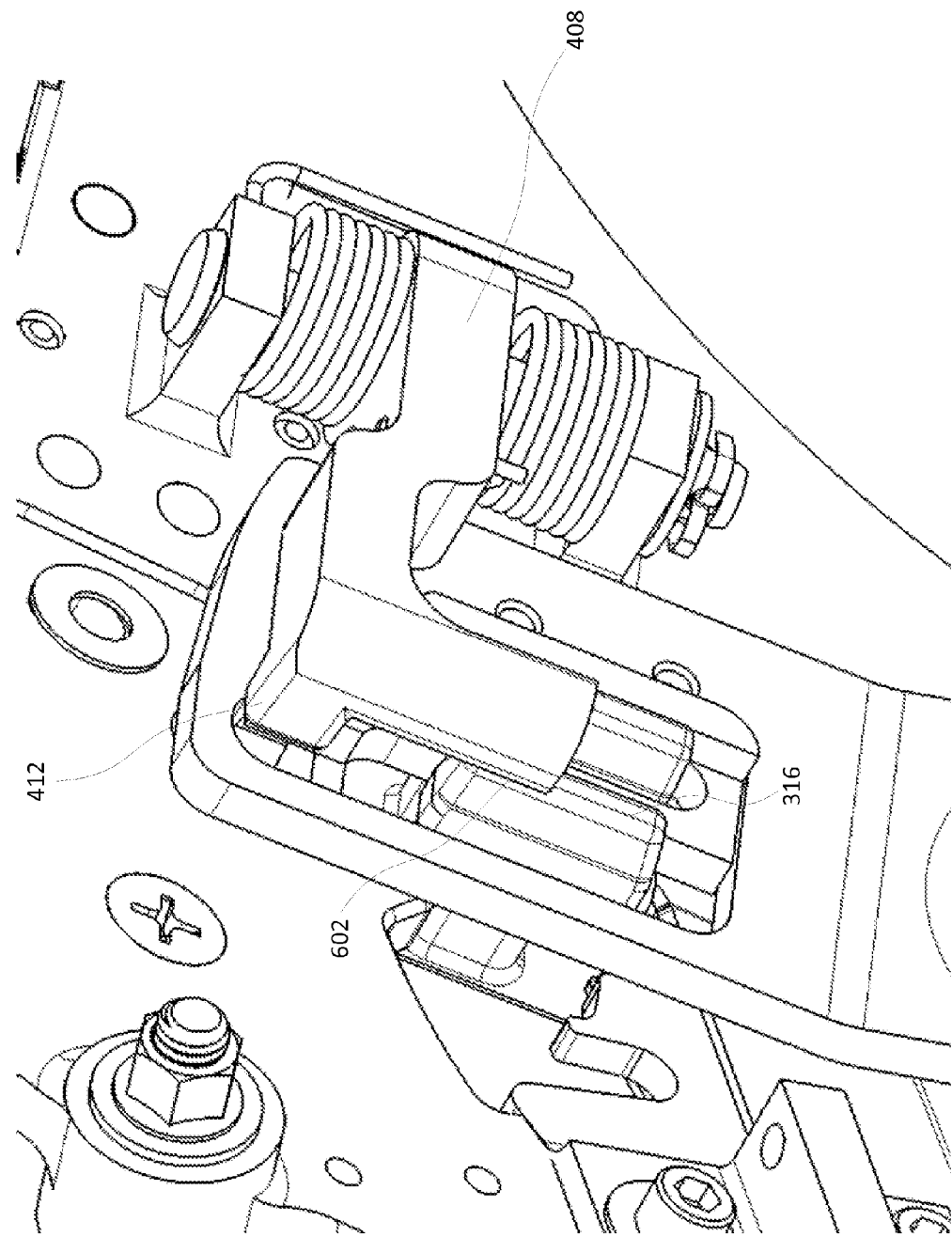

SINGLE LEVER POWER CONTROL

BACKGROUND

1. Field of the Invention

The invention relates to controlling an airplane. Among other fields and applications, the invention has utility in an improved lever for controlling an airplane.

2. Description of Related Art

Airplane manufacturers continually strive to improve aircraft safety and ease of use. Conventionally, variable pitch propeller airplanes have been controlled by a three lever system that includes a condition lever, a power lever, and a propeller lever. The condition lever is used to control starting of the engine and fuel mixture to the engine. The power lever is used to control the engine's revolutions per minute (RPM). The propeller lever is used to control the pitch on a propeller resulting in thrust. Each of these levers is connected to a wire cable which proceeds to an engine compartment. A pilot manipulates these levers, and the corresponding cables, to start, taxi, and fly an aircraft.

During flight and while on the ground, it is critical for safe airplane operation that the pilot manipulate the correct lever. A knob of each of the levers has a unique color and shape to assist a pilot in distinguishing the levers. Even with unique colors and shapes, a pilot may accidentally manipulate the incorrect lever.

SUMMARY OF THE EXAMPLE EMBODIMENTS

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The example embodiments relate to a single lever power control system. In an example, the system may include a condition cable controlling mechanism configured for controlling adjustment of a condition cable, a power cable controlling mechanism configured for controlling adjustment of a power cable, and a single lever coupled to the condition cable controlling mechanism and to the power cable controlling mechanism. During manipulation of the single lever to control adjustment of the power cable, the condition cable controlling mechanism is configured to prevent adjustment of the condition cable. During manipulation of the single lever to control adjustment of the condition cable, the power cable controlling mechanism is configured to prevent adjustment of the power cable.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 6A-C illustrate a lever in a high idle position of the feather mode in accordance with example embodiments.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, apparatuses, or devices. The following detailed description is, therefore, not to be taken in a limiting sense.

Figure 1:
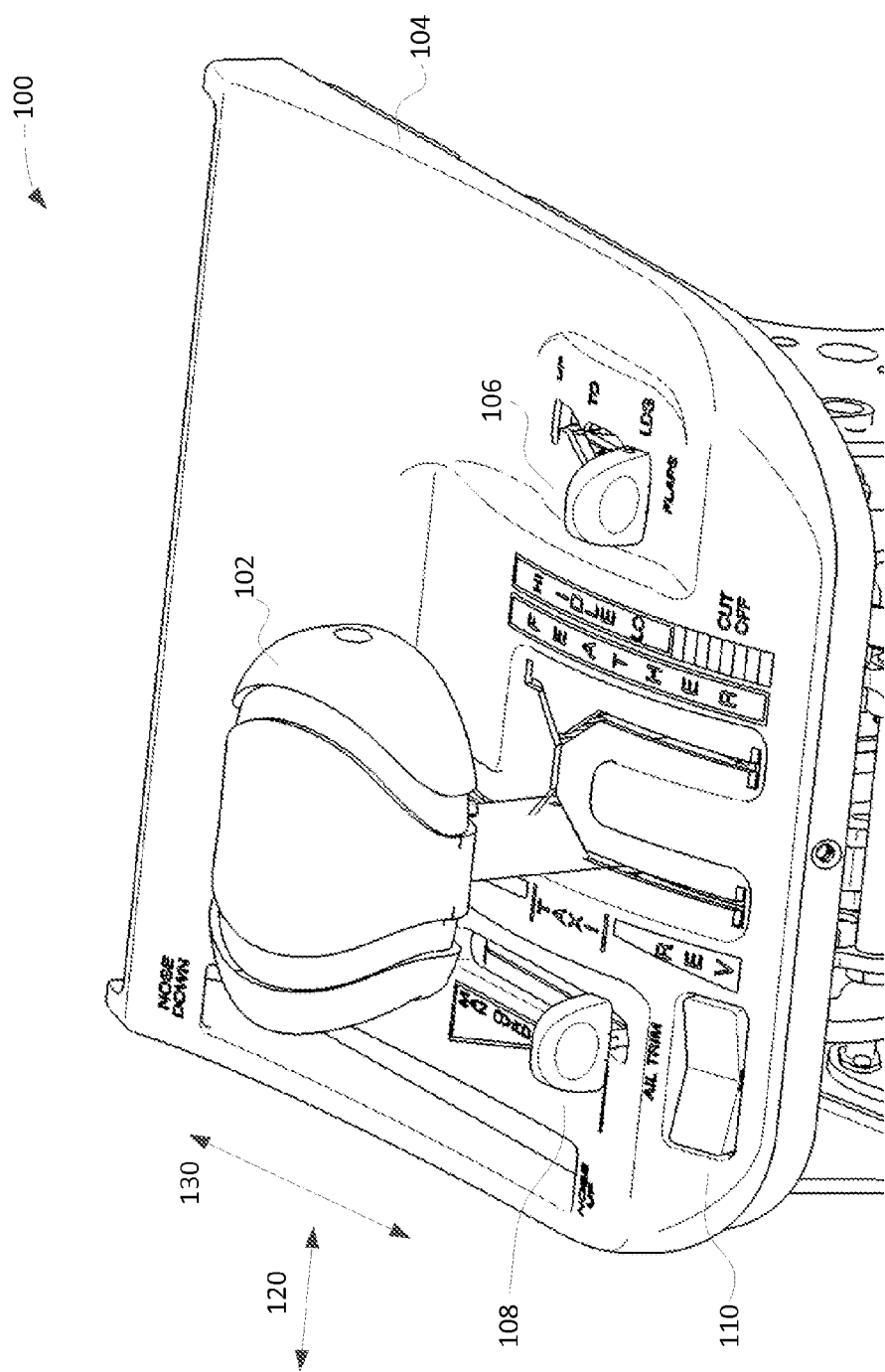
FIG. 1 illustrates a single lever power control (SLPC) system in accordance with example embodiments.

FIG. 1 illustrates a single lever power control (SLPC) system 100 in accordance with example embodiments. The SLPC 100 may be included in an aircraft having one or more propellers, including, for example, variable pitch propellers. The SLPC system 100 may provide a single lever that eliminates or reduces the possibility of a pilot reaching for and moving the wrong lever, especially during a panic or quick to react situation. As depicted, the SLPC system 100 may include a single lever 102 and a top plate 104 that optionally may include one or more levers and/or switches. Flap Lever 106 may be located on the right side of the top plate 104 and may be used to operate flaps on an aircraft by sending one or more signals (e.g., one or more discrete signals) depending on the position of flap lever 106. Examples of three possible positions for flap lever 106 are Up, Landing, and Takeoff Lever 102 may be centrally located on top plate 104 and may have a large knob for the pilot to grip. Manual Over-ride (MOR) lever 108 may be located on the left side of the top plate 104. MOR lever 108 may be connected to the aircraft by a wire cable and may operate the engine's throttle in the event lever 102 fails to function. Aileron Trim Switch 110 may be a rocker type switch for sending one or more signals (e.g., one or more discrete signals) depending on which side is depressed to adjust trim on the aircraft's ailerons. Top plate 104 may contain markings for some or all of the levers and switches identifying functions and placement of each command.

Lever 102 may be mechanically controlled to travel a substantially "h"-shaped pattern over the top plate 104. A pilot may manipulate lever 102 in the directions of double-sided arrows 120 and/or 130 to traverse the "h"-shaped pattern. Herein, moving lever 102 along the direction of double-sided arrow 120 will be referred to as to the left or to the right relative to top plate 104. Moving lever 102 along the direction of double-sided arrow 130 will be referred to as to the front or to the back relative to top plate 104. Positioning of the lever 102 on the left side of the h-shaped pattern may designate that the aircraft is in a flight mode and on the right side of the h-shaped pattern may designate that the aircraft is in a feather mode.

In flight mode, lever 102 may be placed in a reverse thrust position, a taxiing position, a flight idle position, and a forward thrust position. In feather mode, lever 102 may be placed in a cutoff position, a low idle position, and a high idle position. When in feather mode the pitch on the airplane's propeller is feathered meaning there is no forward pull on the aircraft. When in flight mode the airplane's propeller is no longer feathered meaning that the propeller exerts forward pull on the aircraft (e.g., for taxiing and/or flying the aircraft).

Also discussed herein, the SLPC system 100 may include mechanical safety gates that prohibit the pilot from accidentally moving the lever 102 in an undesired location. In some examples, any movement that is considered a safety of flight movement may prompt the pilot to provide a second motion (e.g., actuate a trigger, lift knob of lever 102, etc.) to release a safety gate.

FIGS. 2A-2D illustrate the SLPC system 100 with the top plate 104 removed in accordance with example embodiments. As depicted, the SLPC system 100 includes a single lever 102 mechanically coupled between a power cable controlling (PCC) mechanism 150 and a condition cable controlling (CCC) mechanism 170. The PCC mechanism 150 may control when the pilot can use the single lever 102 to adjust the power cable 240, and the CCC mechanism 170 may control when the pilot can use the single lever 102 to adjust the condition cable 242. Single lever 102 may control which cable is being operated depending on which direction the pilot moves lever 102. As discussed below, moving lever 102 toward the PCC mechanism 150 causes the CCC mechanism 170 to prevent the condition cable 242 from moving. In some examples, the condition cable 242 does not move during flight mode since the condition cable 242 controls the amount of fuel supplied to the airplane's engine. Conversely, moving lever 102 toward the CCC mechanism 170 causes the PCC mechanism 150 to prevent the power cable 240 from moving. The PCC mechanism 150 restricts movement of the power cable 240 during engine startup and shutdown to protect the engine from over speed.

Figure 2A:
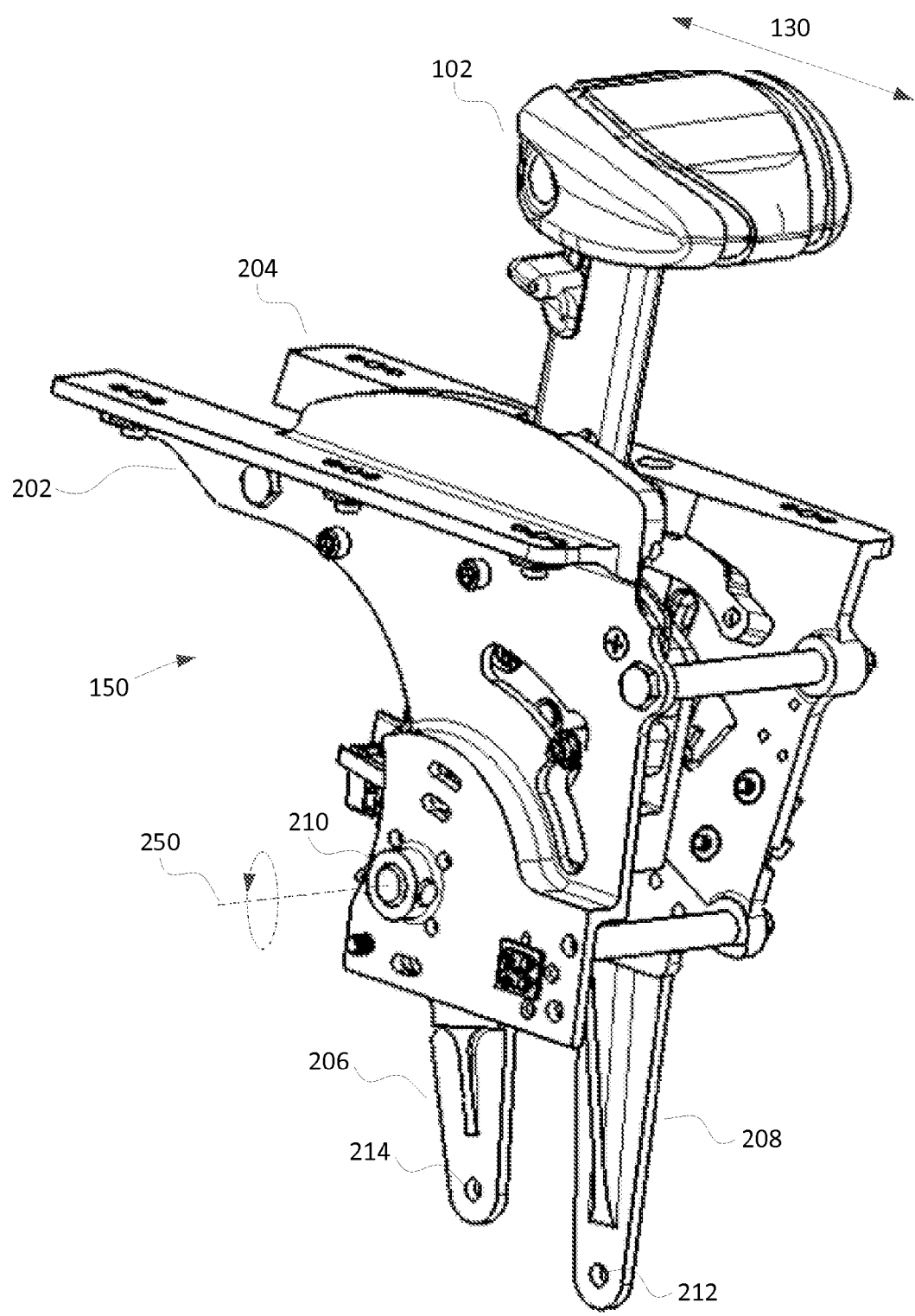
FIGS. 2A-D illustrate the SLPC system with a top plate of FIG. 1 removed in accordance with example embodiments.

With reference to FIG. 2A, the PCC mechanism 170 may include a side plate 202 and a power arm 206. A power cable 240 (see also FIG. 2D) may be coupled to power arm 206 through aperture 214. The power cable 240 may be used to control RPMs of the airplane's engine. When lever 102 is in the flight mode (i.e., on the left side of top plate 104), movement of lever 102 to the front or back causes power arm 206 to rotate about rod 210 and thereby cause the power cable 240 to move. Also when in flight mode, the CCC mechanism 170 prevents movement of lever 102 from moving the condition cable 242.

Figure 2B:
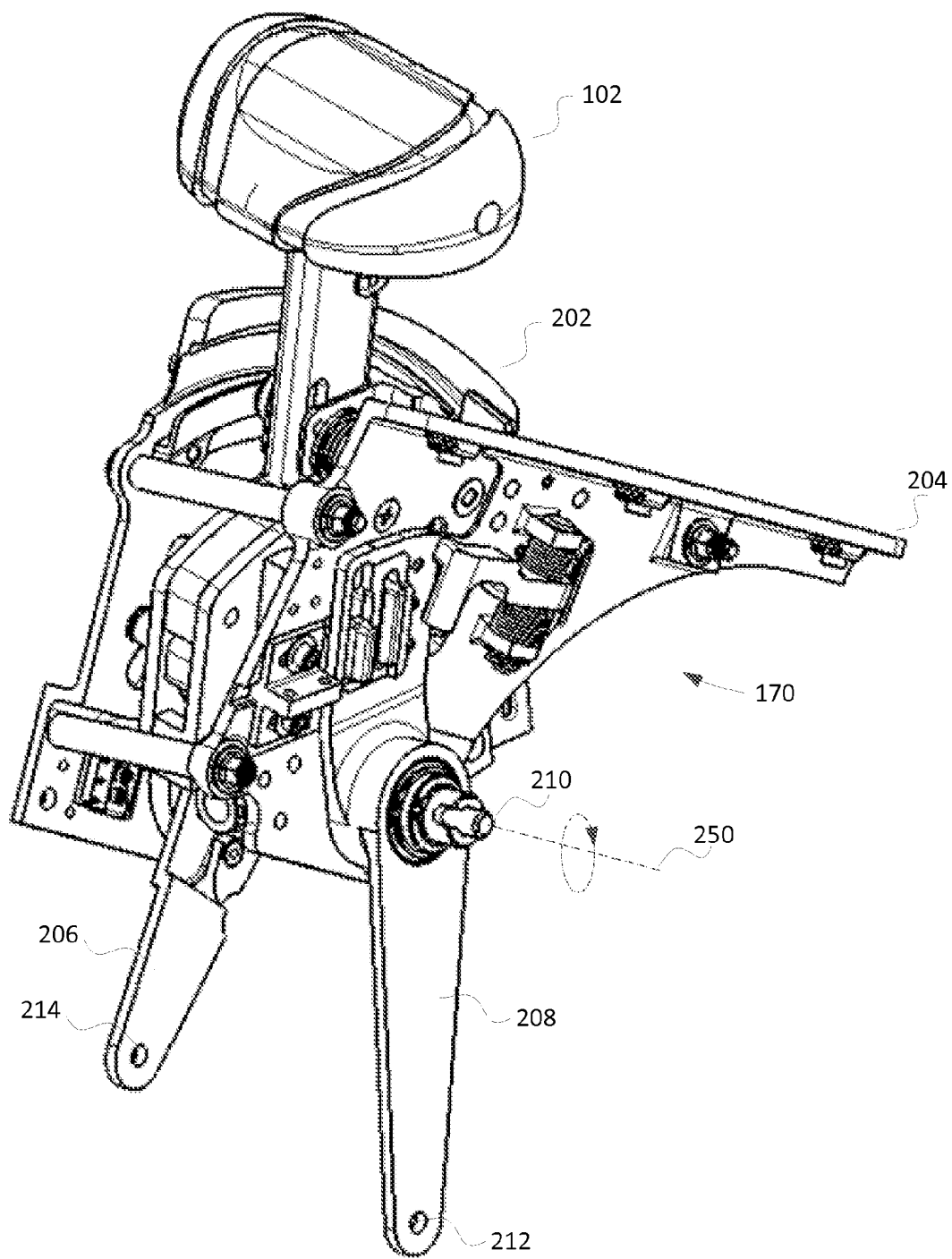
Figure 2C:
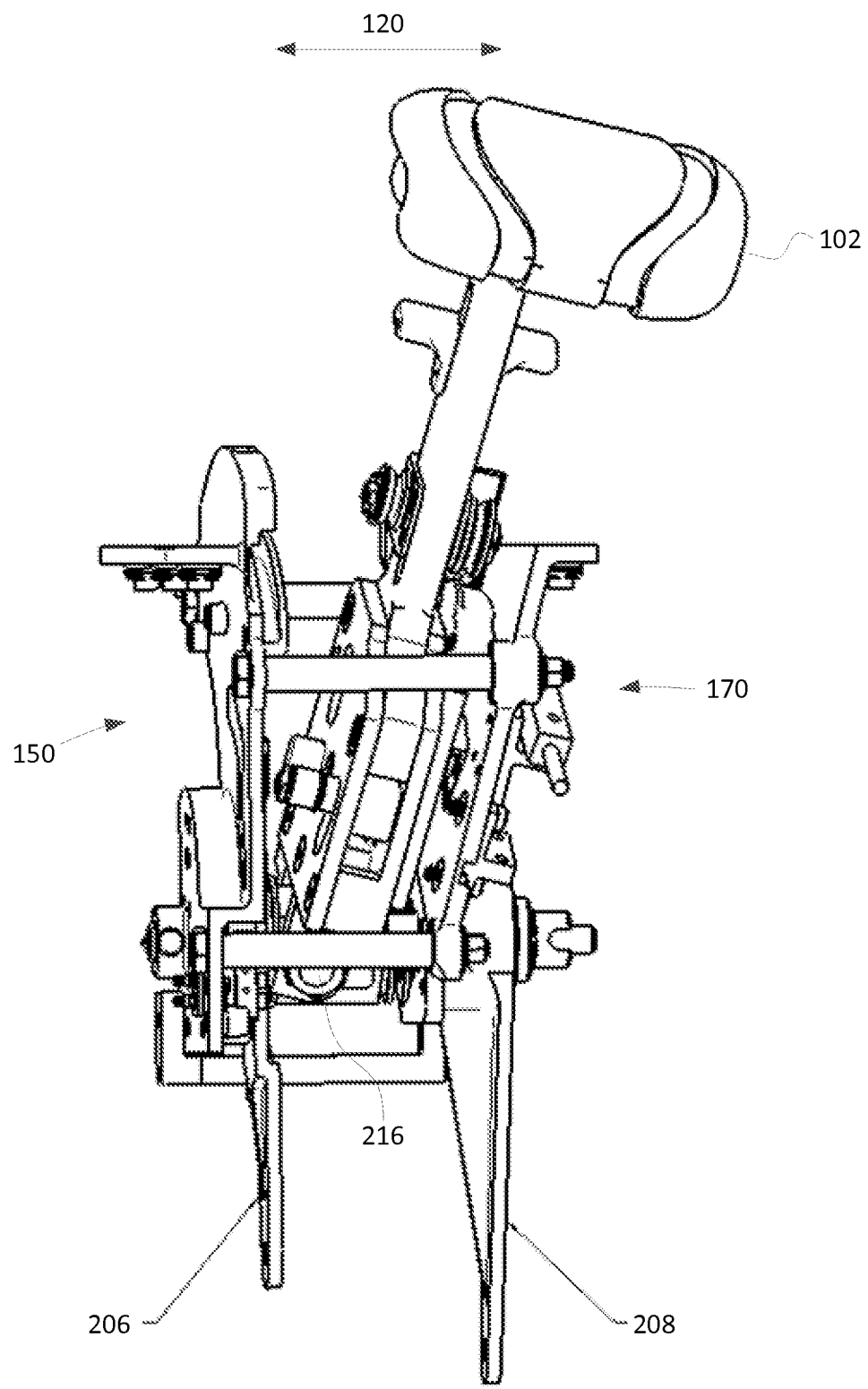
Figure 2D:
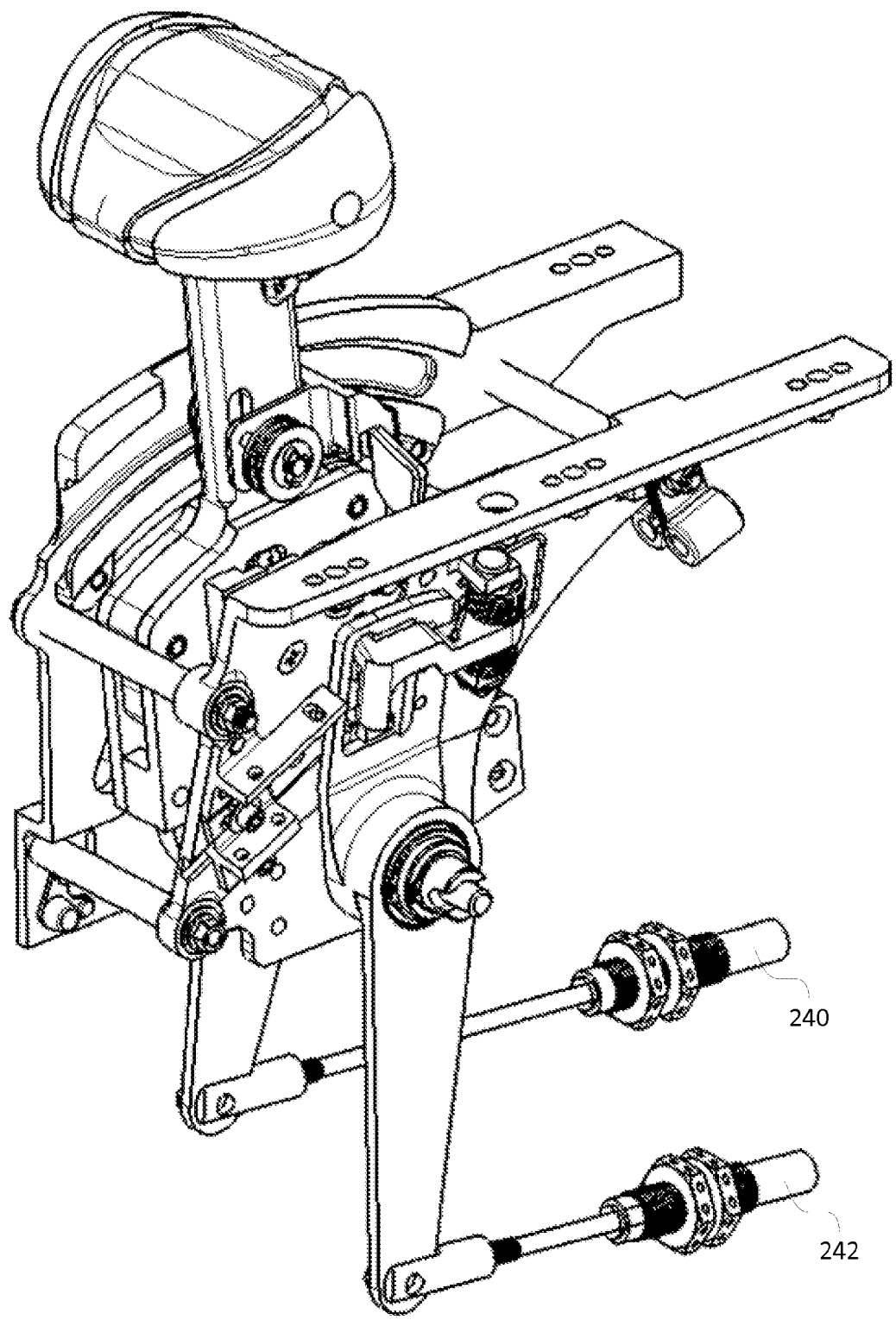

With reference to FIG. 2B, the CCC mechanism 150 may include a side plate 204 and a condition arm 208. A condition cable 242 (see also FIG. 2D) may be coupled to condition arm 208 through aperture 212. The condition cable 242 may be used to control delivery of fuel to the airplane's engine. When lever 102 is in the feather mode (i.e., on the right side of top plate 104), movement of lever 102 to the front or back causes condition arm 208 to rotate about rod 210 and thereby cause the condition cable 242 to move. Also when in flight mode, the PCC mechanism 150 prevents movement of lever 102 from moving the power cable 240. In some examples, rod 210 may be fixed (e.g., does not rotate), and power arm 206, condition arm 208, and lever 102 may rotate about rod 210.

Figure 3A:
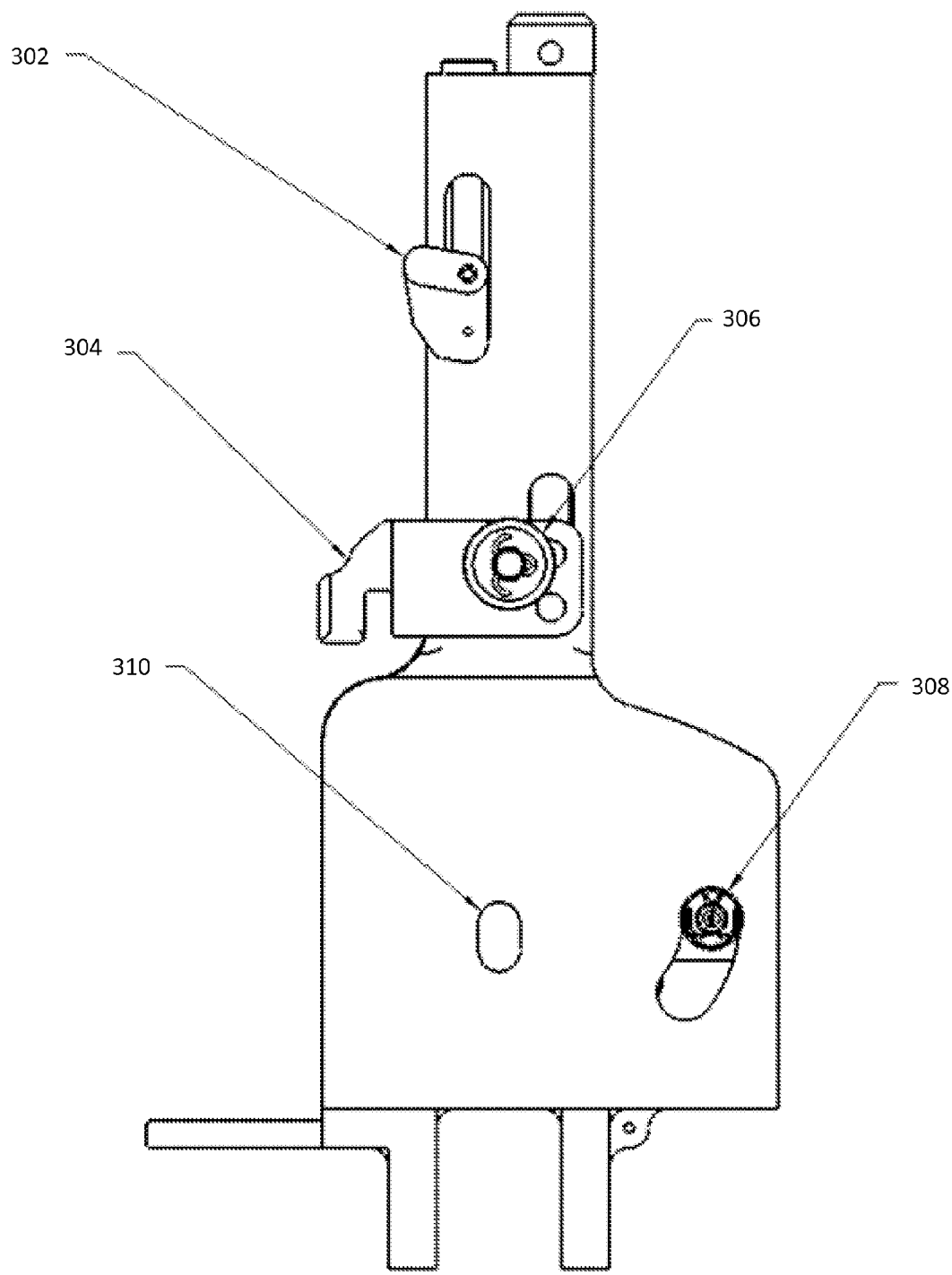
FIGS. 3A-C illustrate left side, front, and right side views of a lever in accordance with example embodiments.
Figure 3B:
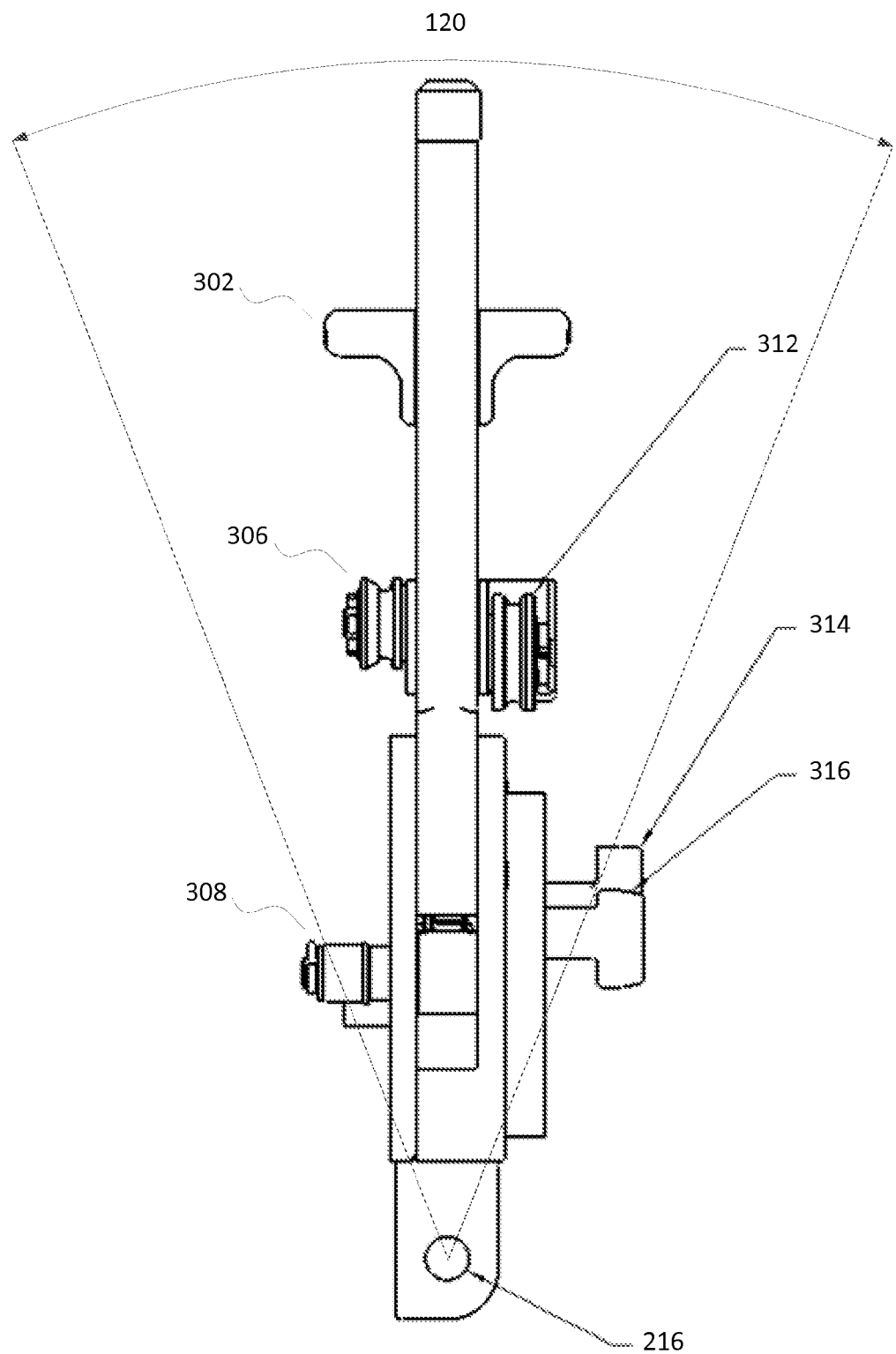
Figure 3C:
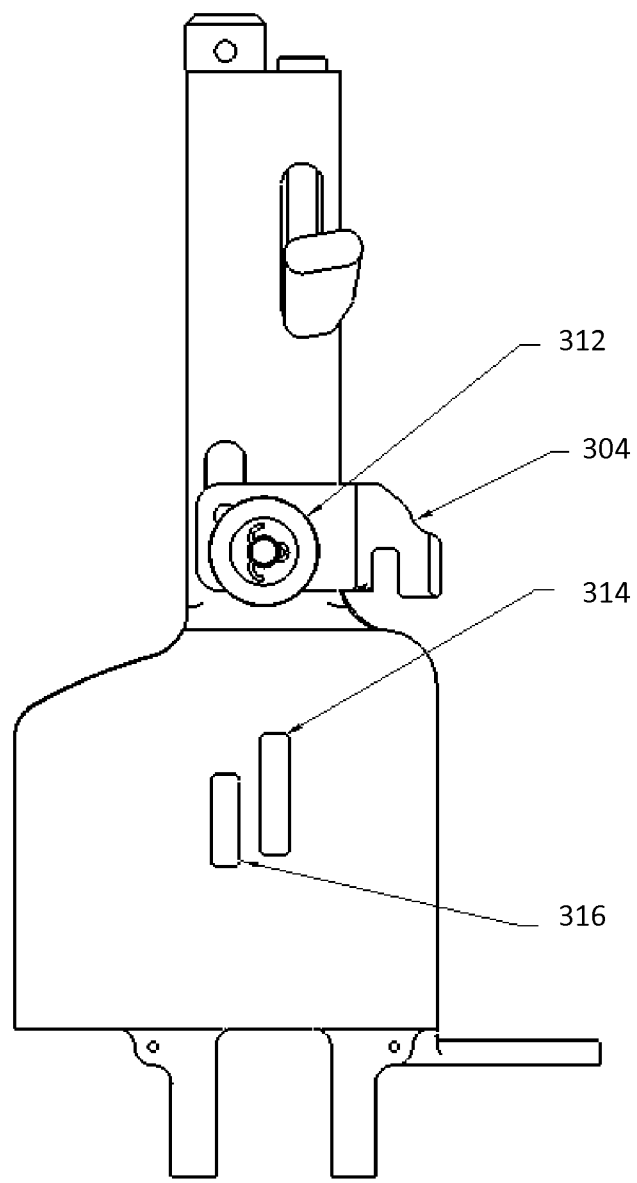

FIGS. 3A-C illustrate left side, front, and right side views of the single lever 102 in accordance with example embodiments. For illustrative purposes, lever 102 is depicted without its knob. As depicted, the lever 102 may include a thrust reverse trigger 302, a cross over guide 304, a power roller 306, a thrust reverse roller 308, a power arm drive 310, a condition roller 312, a condition rail 314, and a condition pin 316. These components interact with the PCC mechanism 150 and/or the CCC mechanism 170 as further described below. For instance, the cross over guide 304 may control forward and backward movement of lever 102 when transitioning from left to right and from right to left.

Figure 4A:
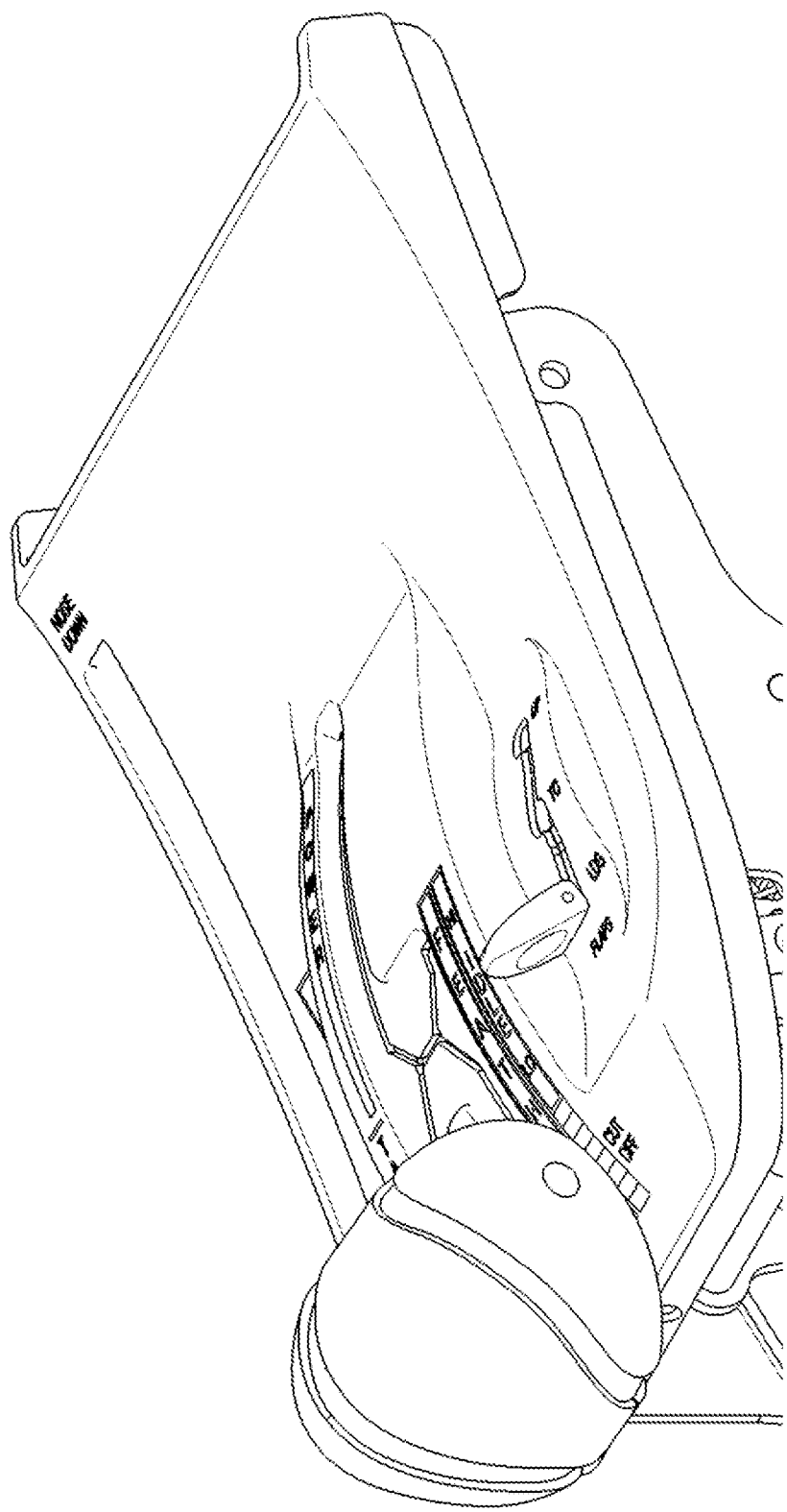
FIGS. 4A-C illustrate a lever in a cutoff position of a feather mode in accordance with example embodiments.

FIGS. 4-19 describe movement of the single lever 102 in conjunction with operation of the PCC mechanism 150 and the CCC mechanism 170 to control which of the condition cable 242 and the power cable 240 is permitted to move in accordance with example embodiments. With reference to FIG. 4A, lever 102 may be positioned in the lower right of the h-shaped pattern when the airplane is in a "cut-off" position, meaning that the plane's engine is turned off.

Figure 4B:
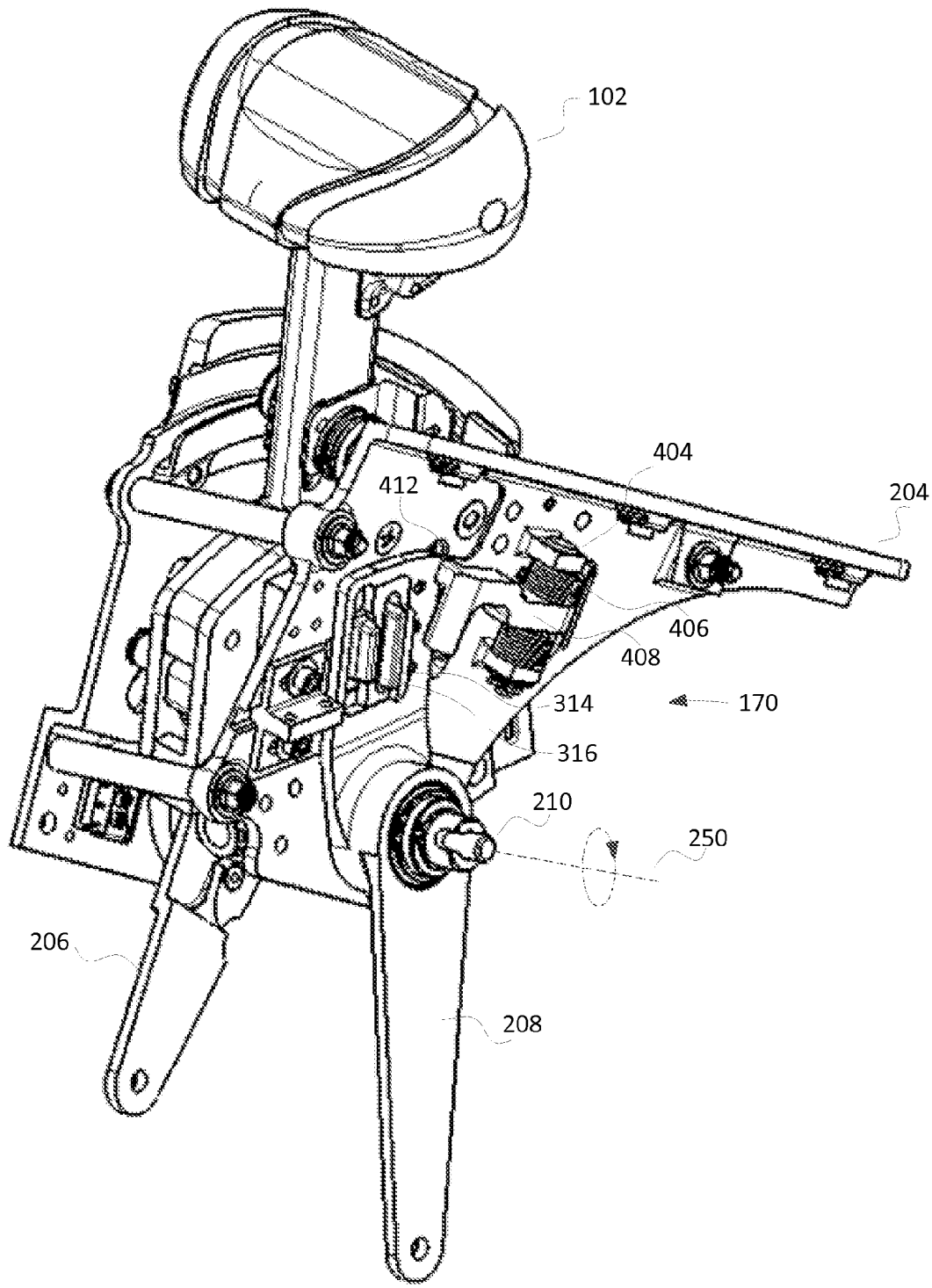
Figure 4C:
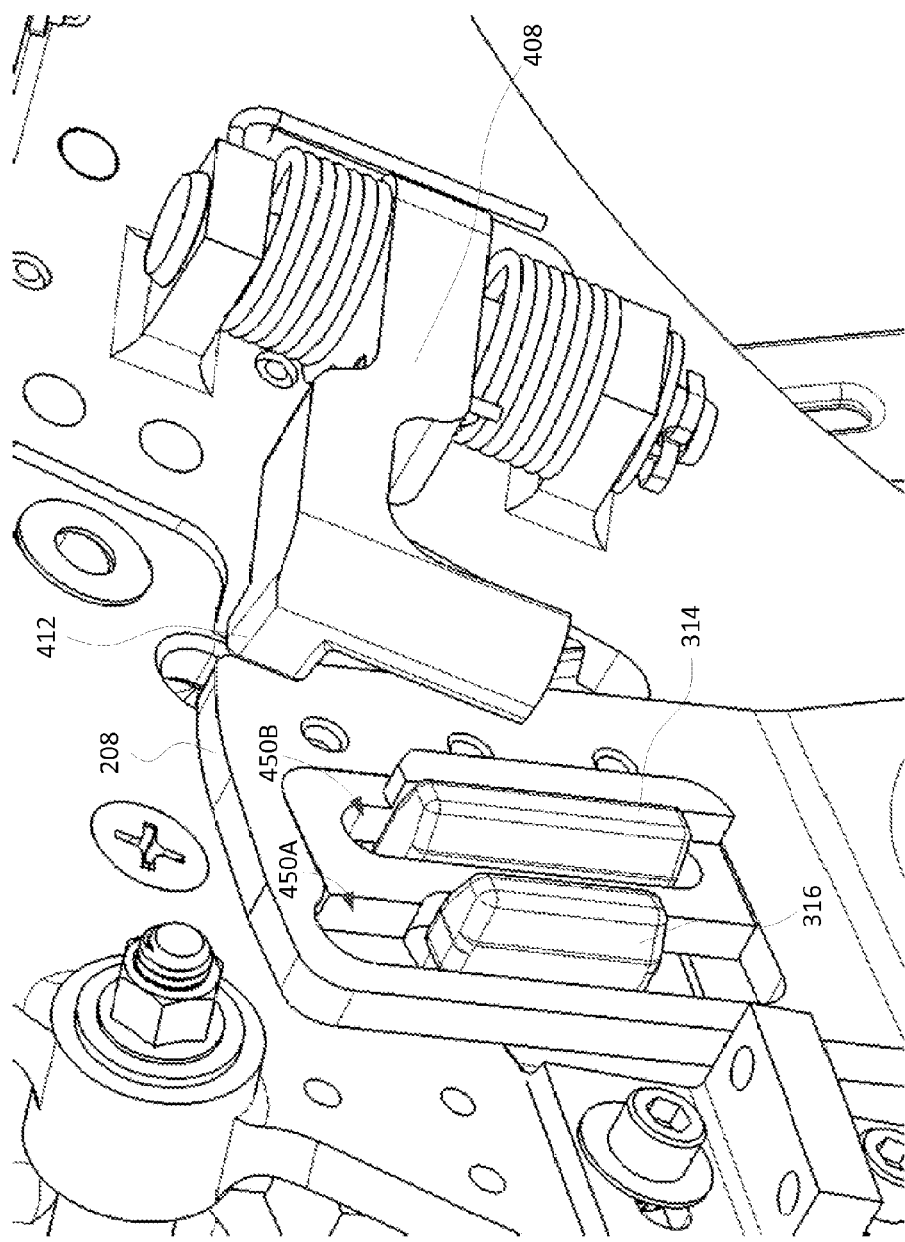

FIGS. 4B-C illustrate the lever without the top plate in the cutoff position. As can be seen, condition rail 314 and condition pin 316 may respectively extend through vertical slots 450A-B in the condition arm 208 and may be separated from a condition latch 408 of the CCC mechanism 170. The condition latch 408 may be used to control when the condition arm 208 is locked in place (e.g., mechanically coupled to side plate 204) and cannot rotate about rod 210, even if lever 102 rotates about rod 210. The condition latch 408 may be attached to the side plate 204 by a mounting 404 of the CCC mechanism 170. The condition latch 408 may include biasing device 406 (e.g., a spring) of the CCC mechanism 170 applying a bias (e.g., spring force) to a condition latch 408 to force an end of latch 408 toward the condition arm 208. The condition latch 408 may interact with the condition pin 316 when the lever 102 is moved into and out of the cutoff position.

Figure 5A:
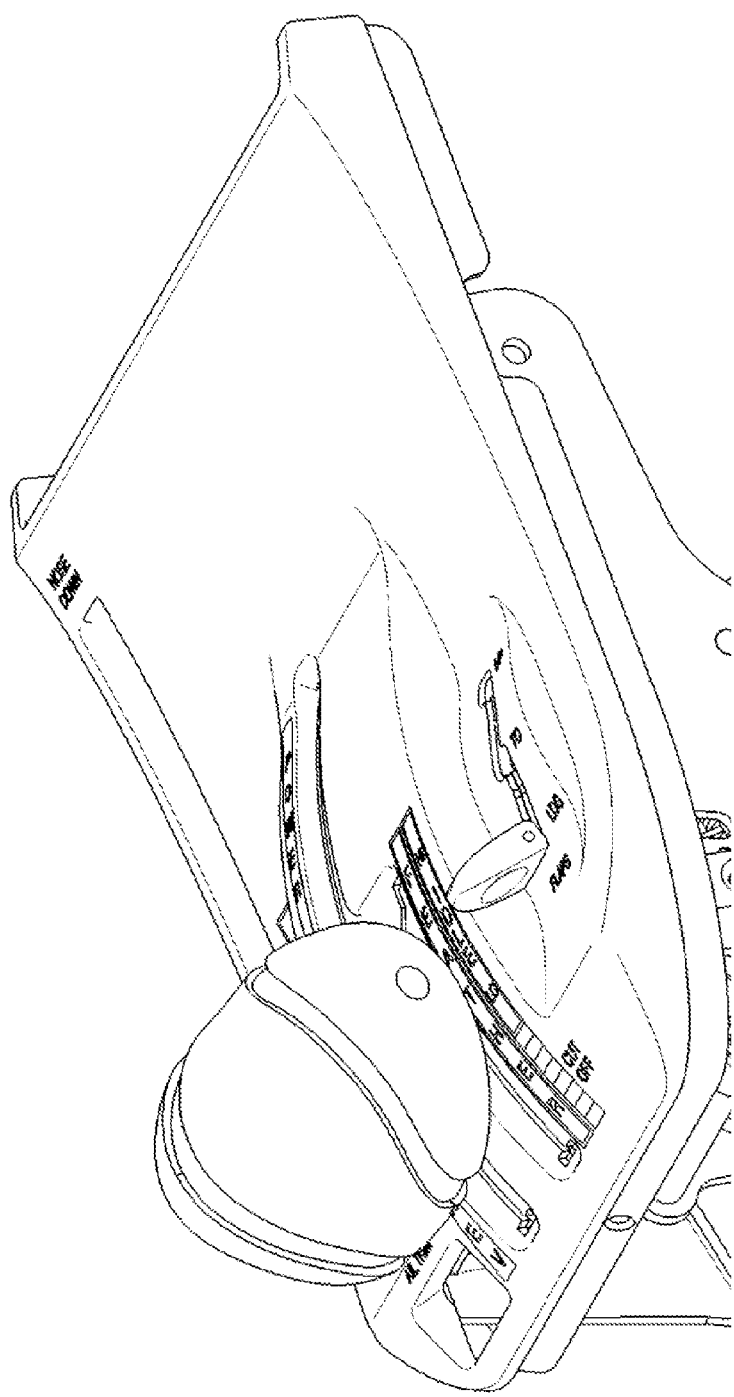
FIGS. 5A-C illustrate a lever in a low idle position of the feather mode in accordance with example embodiments.
Figure 5B:
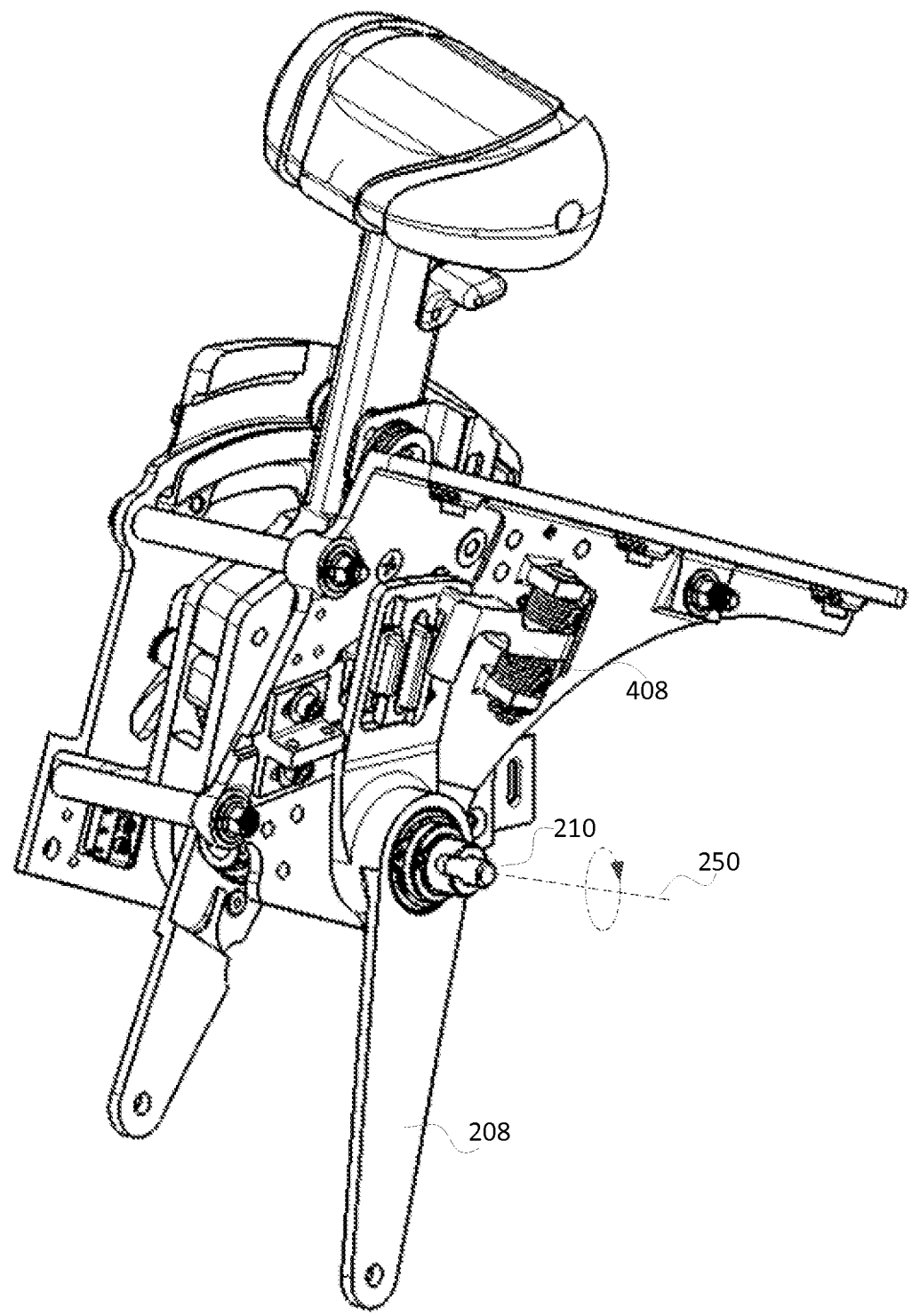
Figure 5C:
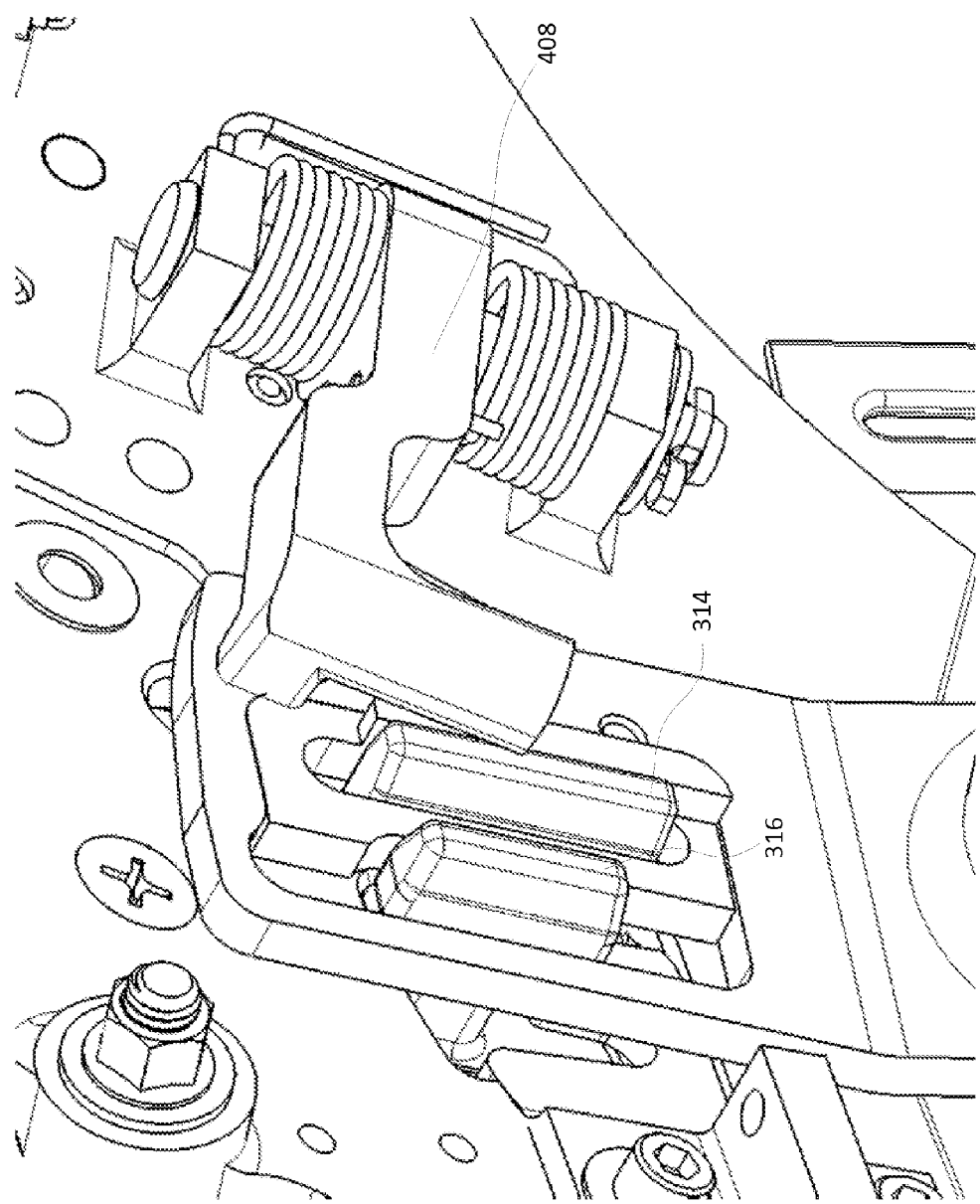

A safety gate may lock the lever 102 in the cutoff position to prevent unintentional lever movement. To move the lever 102 from the locked position the pilot may lift the knob of lever 102 upward (e.g., approximately one quarter inch) to disengage the safety lock and move lever 102 forward to the low idle position, as shown in FIG. 5A. With reference to FIGS. 5B-C, as the pilot moves lever 102 forward from the cutoff position to the low idle position, the lever 102 may rotate about rod 210 causing the condition rail 314 and the condition pin 316 to move toward the condition latch 408 of the CCC mechanism 170. This rotation also moves the condition arm 208 and permits the pilot to adjust the condition cable 242.

Figure 6A:
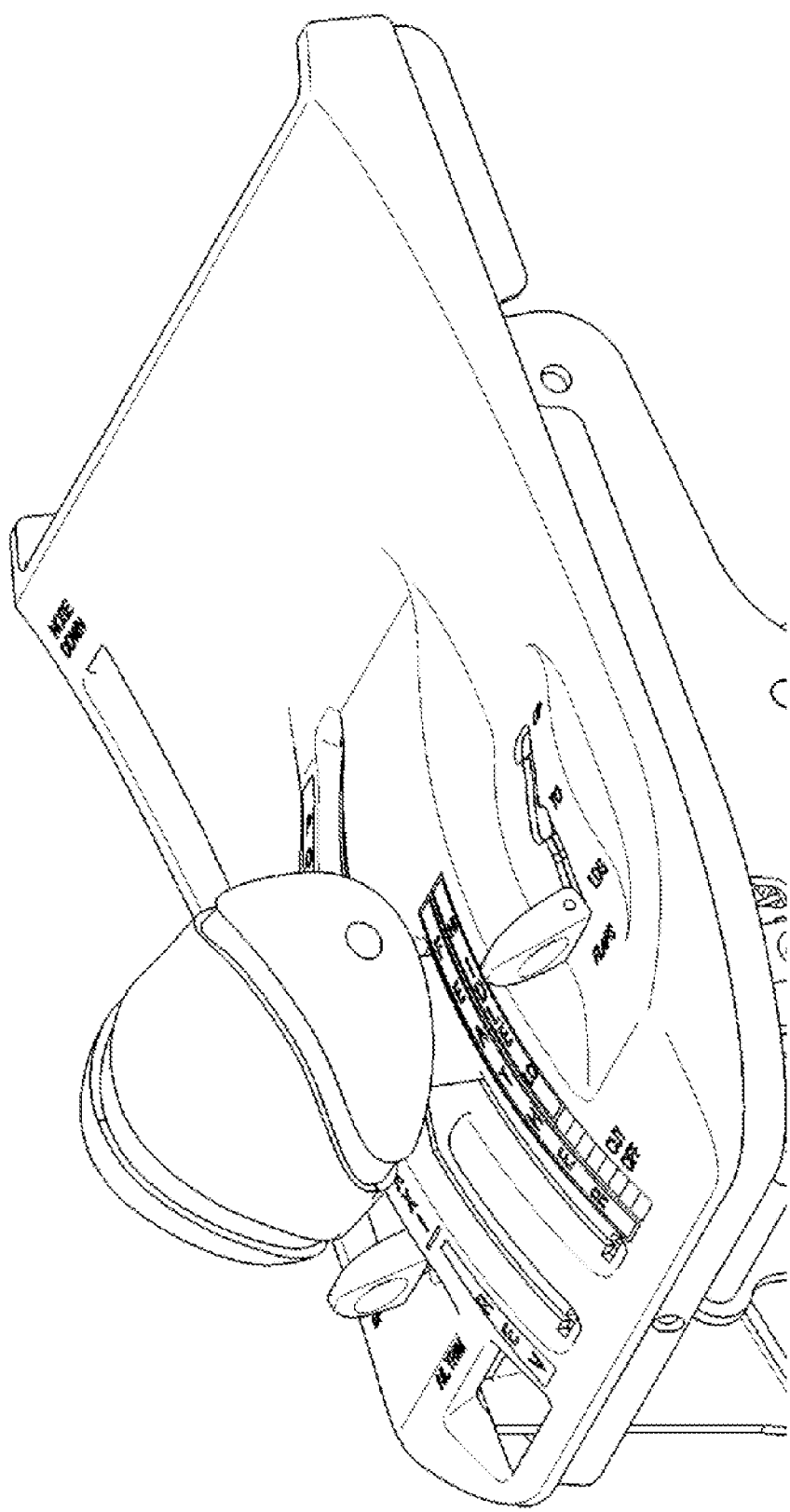
Figure 6B:
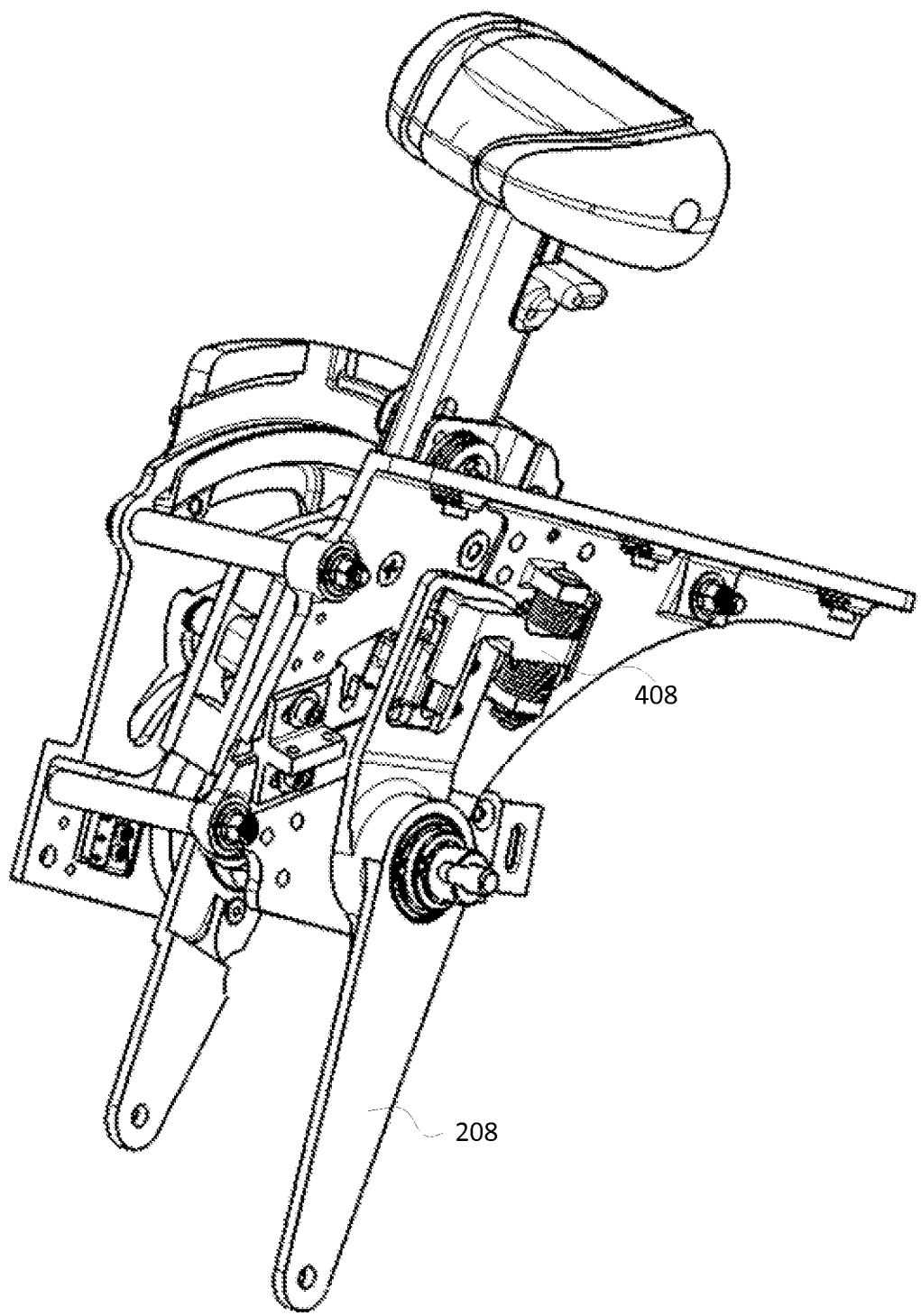

In the idle position, the pilot may start the aircraft's engine. After starting, the pilot may continue to move lever 102 from the low idle position into a high idle position, as seen in FIG. 6A, for warming up the aircraft's engine prior to flight. With reference to FIGS. 6B-C, rotation of lever 102 about rod 210 into the high idle position causes the condition latch 408 to engage the condition pin 316. As seen in FIG. 6C, the biasing device 406 forces a surface 602 of condition latch 408 against the condition pin 316. This rotation may also align latch protrusion 412 of the condition latch 408 with the vertical slot 450A above the condition pin 316 for subsequent insertion into an upper portion of slot 450A. This rotation also moves the condition arm 208 and permits the pilot to adjust the condition cable 242.

Figure 7A:
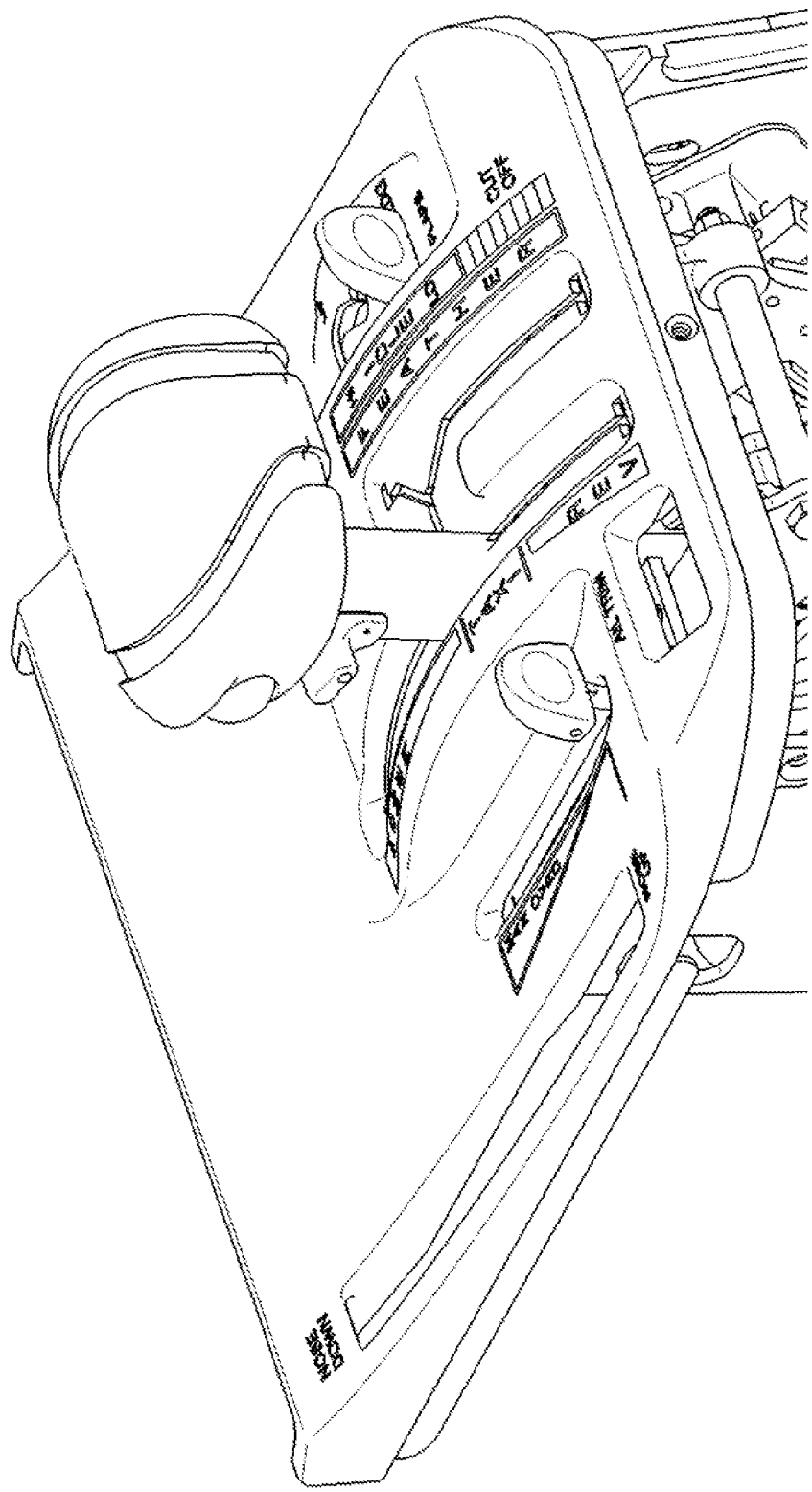
FIGS. 7A-H illustrate transitioning a lever from the high idle position of the feather mode to a flight idle position of the flight mode in accordance with example embodiments.
Figure 7B:
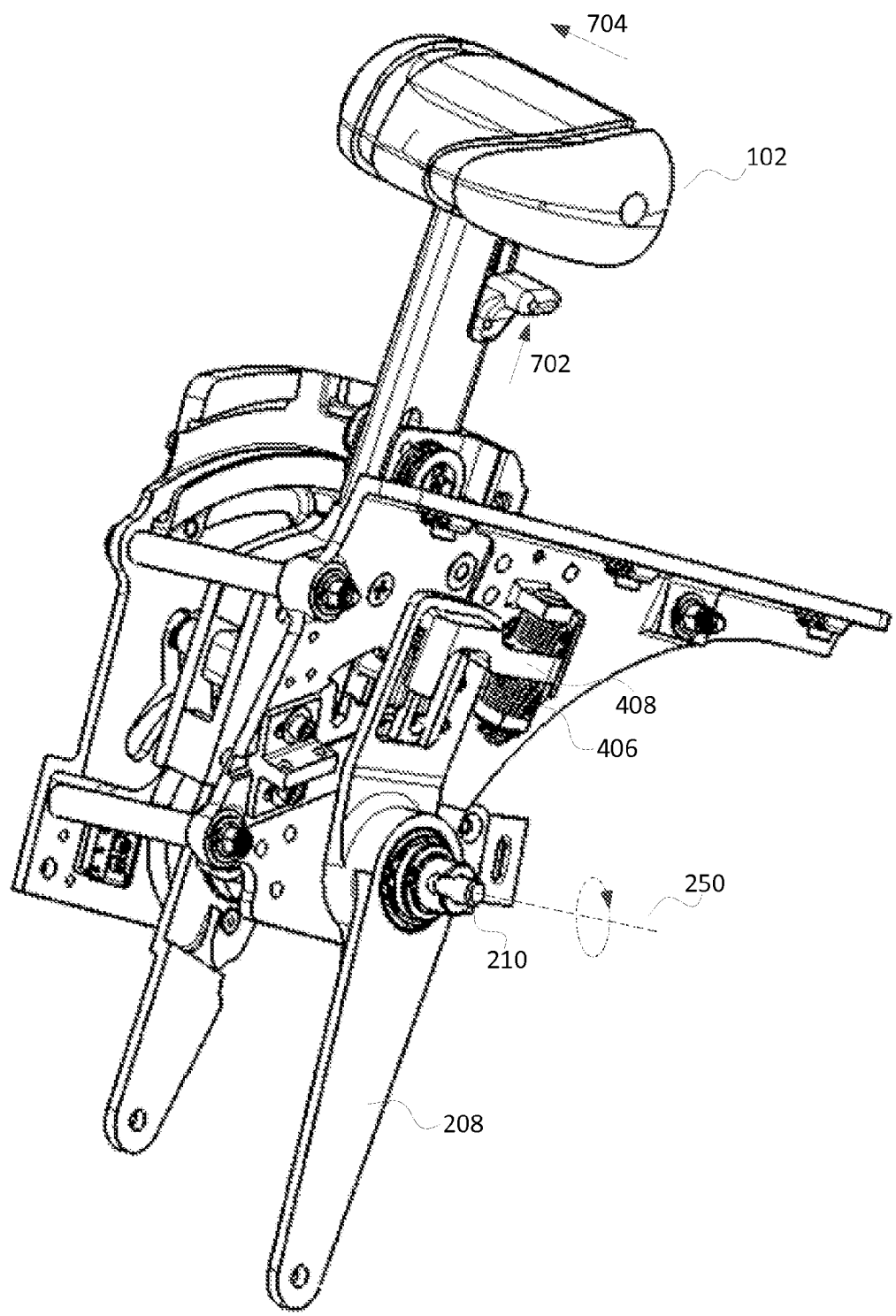
Figure 7C:
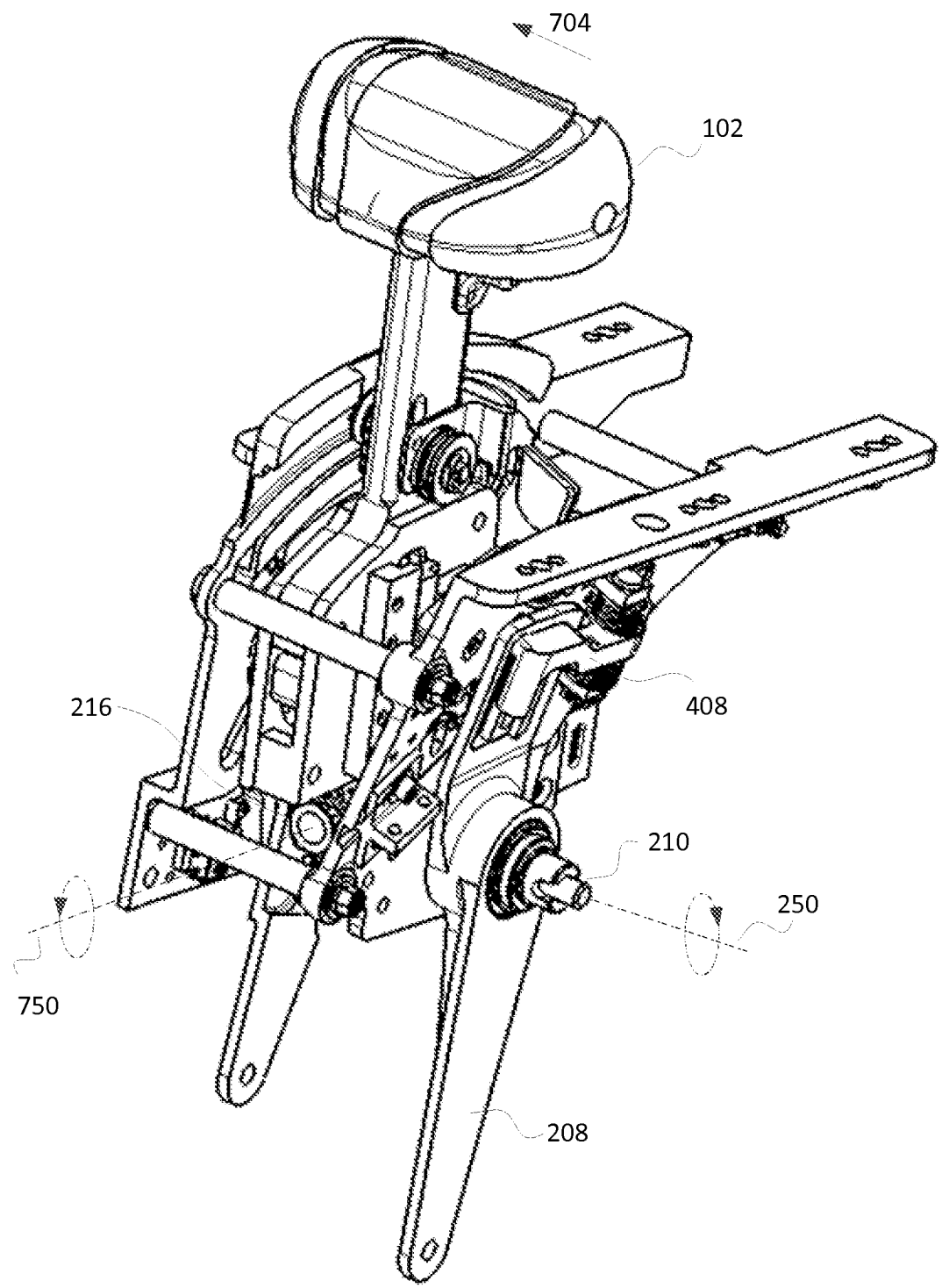
Figure 7D:
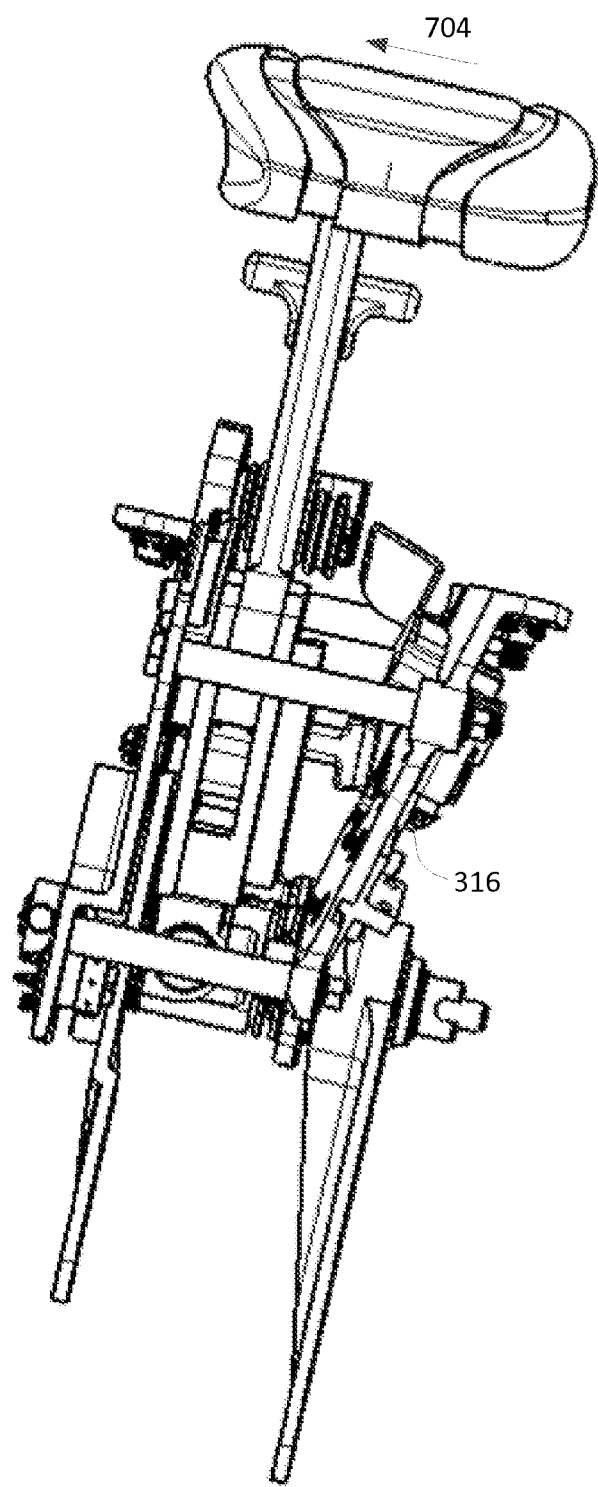

With reference to FIGS. 7A-C, the pilot may move lever 102 from the feather mode to the flight mode (i.e., from the right side of the h-shaped pattern to the left side). This movement initiates pitch to the aircraft's propeller and causes the propeller to create pull on the aircraft. This movement rotates lever 102 about rod 216 toward the PCC mechanism 150 and away from the CCC mechanism 170. The result of this rotation is that the PCC mechanism 150 permits adjustment the power cable 240 and the CCC mechanism 170 prevents further adjustment of the condition cable 242.

To move the lever 102 from high idle to flight idle, a pilot may rotate lever 102 about rod 216 relative to axis 750 in direction 704 from right (shown in FIG. 7B) to left (shown in FIG. 7C). Upon reaching the left side, knob of lever 102 may drop down engaging a safety lock to secure lever 102 in the flight mode. When desired, the pilot may subsequently lift the knob to release the safety gate to return to the high idle position.

In some examples, rotation of lever 102 about rod 210 relative to axis 250 may be in a different direction than the direction lever 102 rotates about rod 216 relative to axis 750. For example, axis 250 may be perpendicular to axis 750. In other examples, axis 250 may be situated at a predetermined angle relative to axis 750.

Figure 7E:
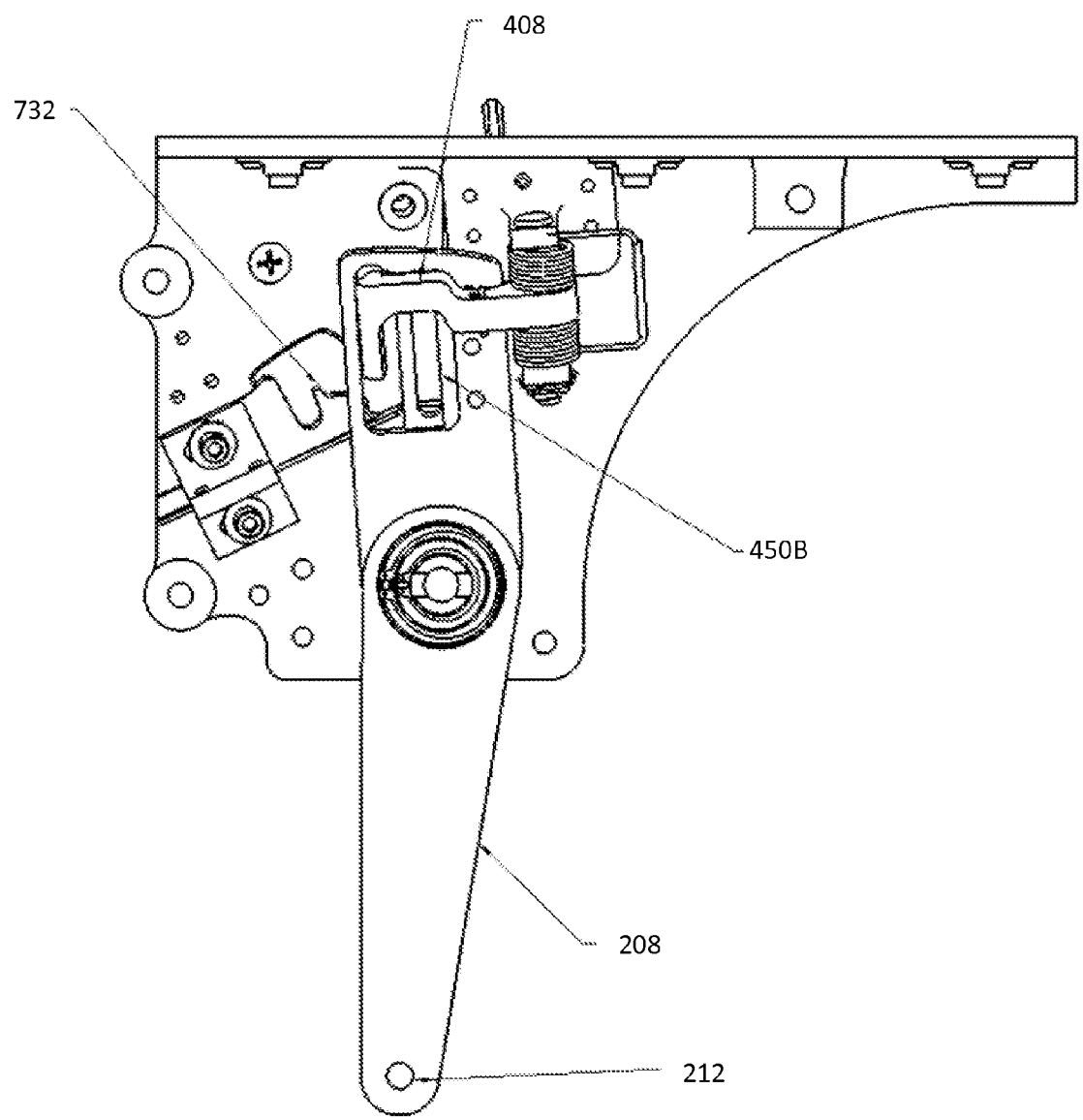
Figure 7F:
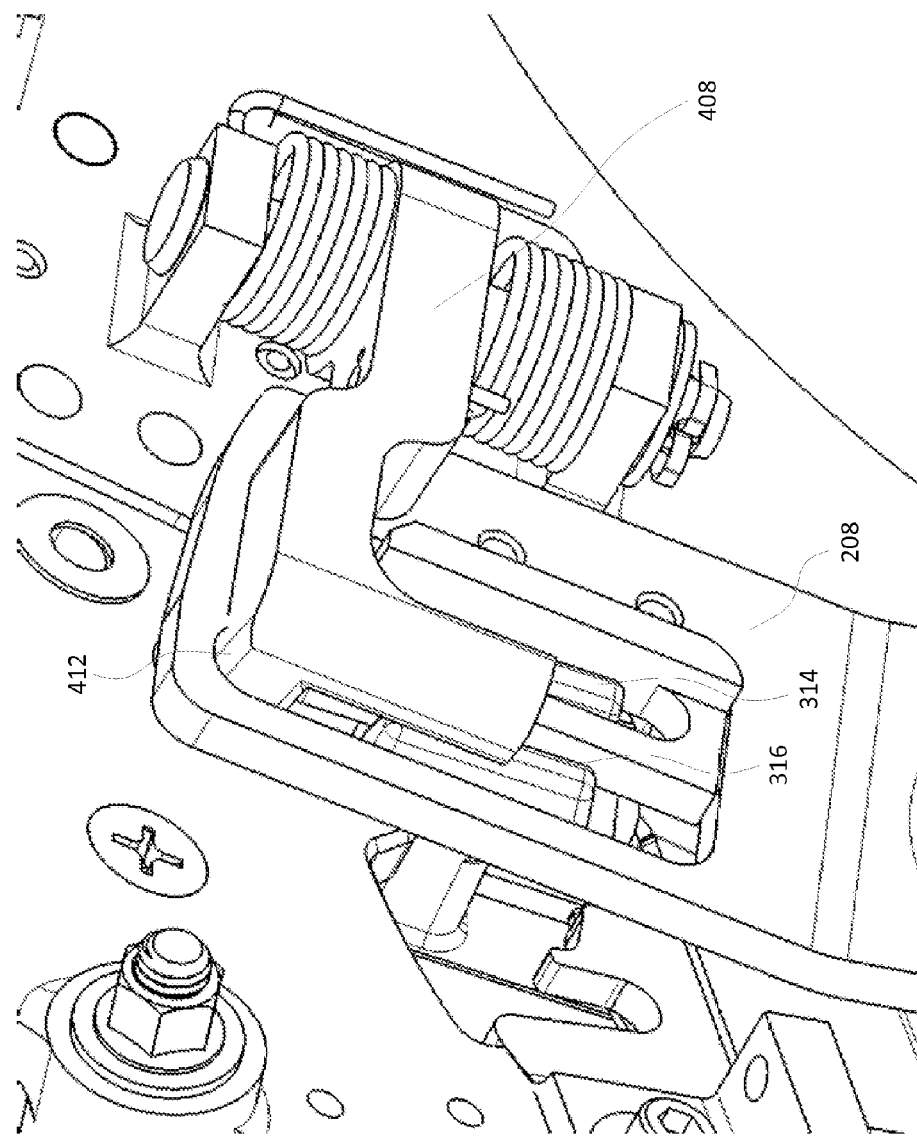

During the rotation from high idle to flight idle, the condition pin 316 may vacate the vertical slot 450A of the condition arm 208 (see FIG. 7D) and the force of biasing device 406 may move latch protrusion 412 into the slot 450A (see FIGS. 7E-F). The inserted latch protrusion 412 prevents the condition arm 208 from rotating about rod 210, even though lever 102 may still rotate about rod 210, and thus the CCC mechanism 170 substantially prevents movement of the condition cable 242 when lever 102 is on the left side of the h-shaped pattern. The substantial movement prevention may permit the condition cable 242 to move somewhat depending on the relative sizes of the slot 450A and the latch protrusion 412. In some examples, the condition cable 242 may not move by more than 0.025 of an inch.

Figure 7G:
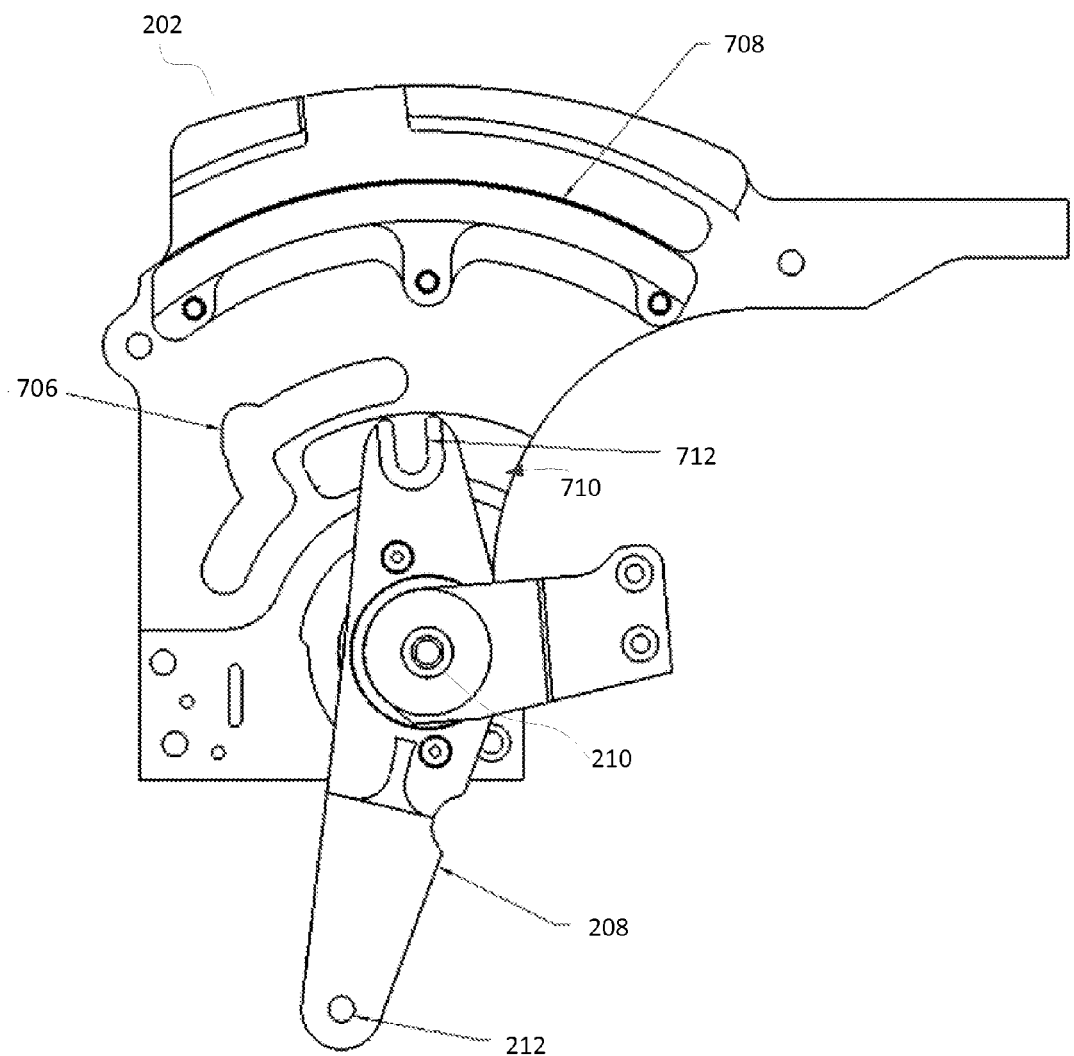
Figure 7H:
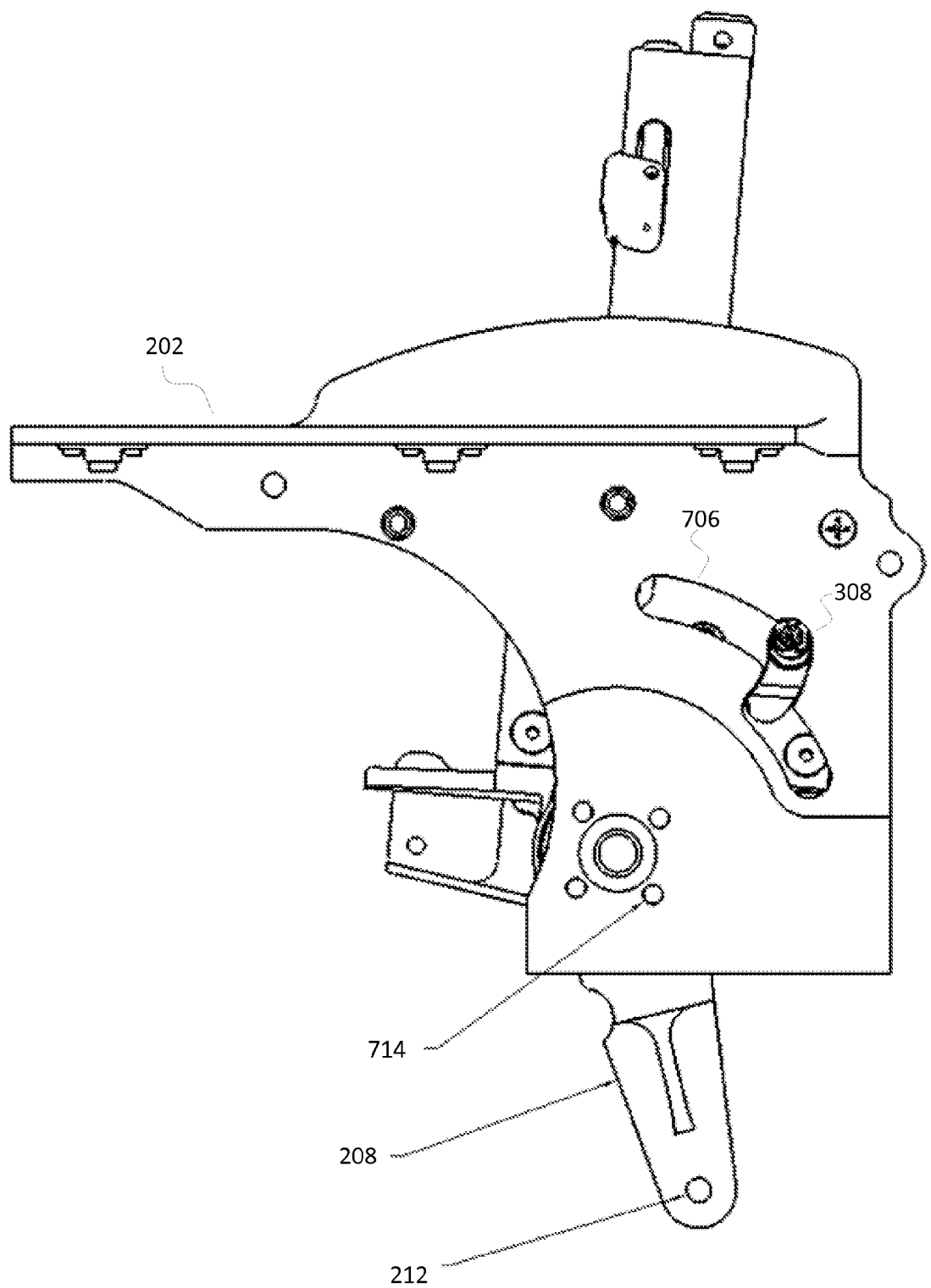

FIGS. 7G-H respectively show right and left side views of side plate 202 when in the flight idle position as the lever 102 has been fully moved toward the PCC mechanism 150 and away from the CCC mechanism 170. As seen in FIG. 7G, the side plate 202 includes a thrust reverse roller track 706, a power roller track 708, and a power arm drive track 710. As seen in FIG. 7H, the thrust reverse roller 308 may extend through side plate 202 when lever 102 is in the flight mode. With reference also to FIGS. 3A-C, the power roller track 708 shown in FIG. 7G receives the power roller 306 and provides a track within which the roller 306 may move when lever 102 is in the flight mode. The thrust reverse roller track 706 shown in FIG. 7H receives the thrust reverse roller 308 and provides a track within which the roller 308 may move when lever 102 is in the flight mode. The power arm drive track 710, in combination with a power arm drive receiver 712 of the power arm 206, receives the power arm drive 310 and provides a track within which the power arm drive 310 may move when lever 102 is in the flight mode. Insertion of the power arm drive 310 into the power arm drive receiver 712 and rotation of lever 102 about rod 210 thus transfers movement of the lever 102 to movement of the power arm 206, and hence enables the pilot to adjust the power cable 240.

Figure 8A:
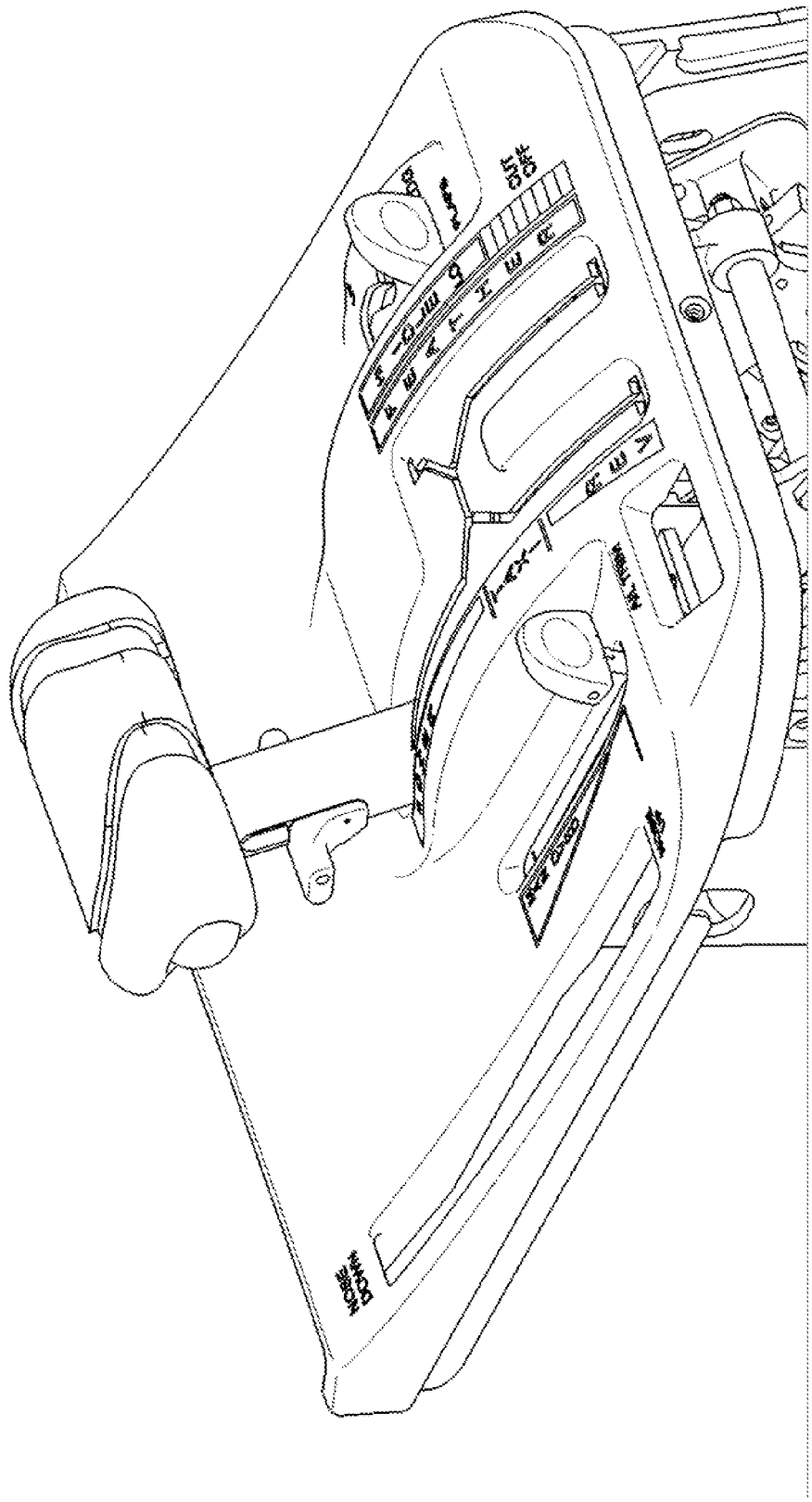
FIGS. 8A-B illustrate movement of a lever to a maximum forward thrust position of the flight mode in accordance with example embodiments.
Figure 8B:
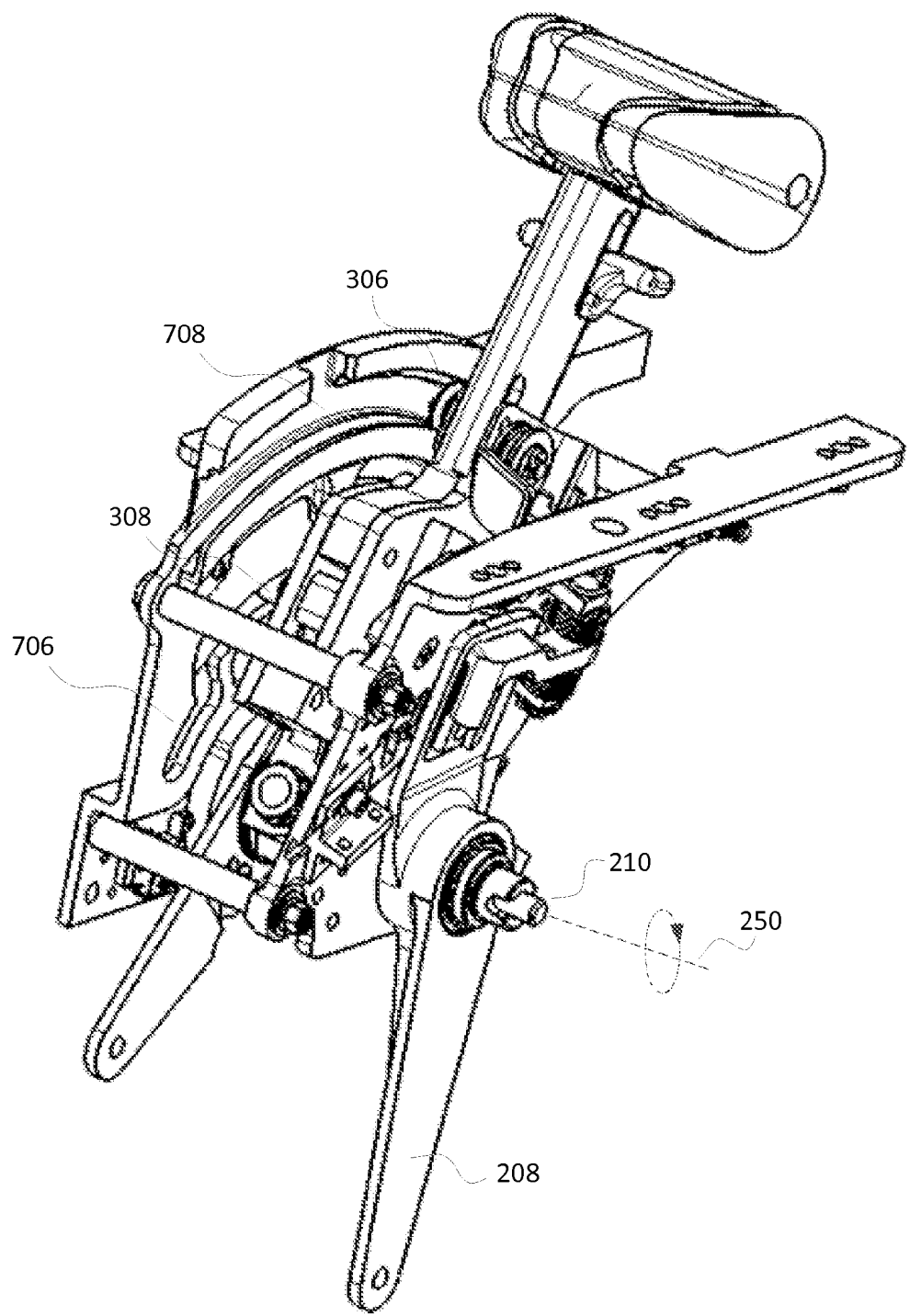
Figure 9:
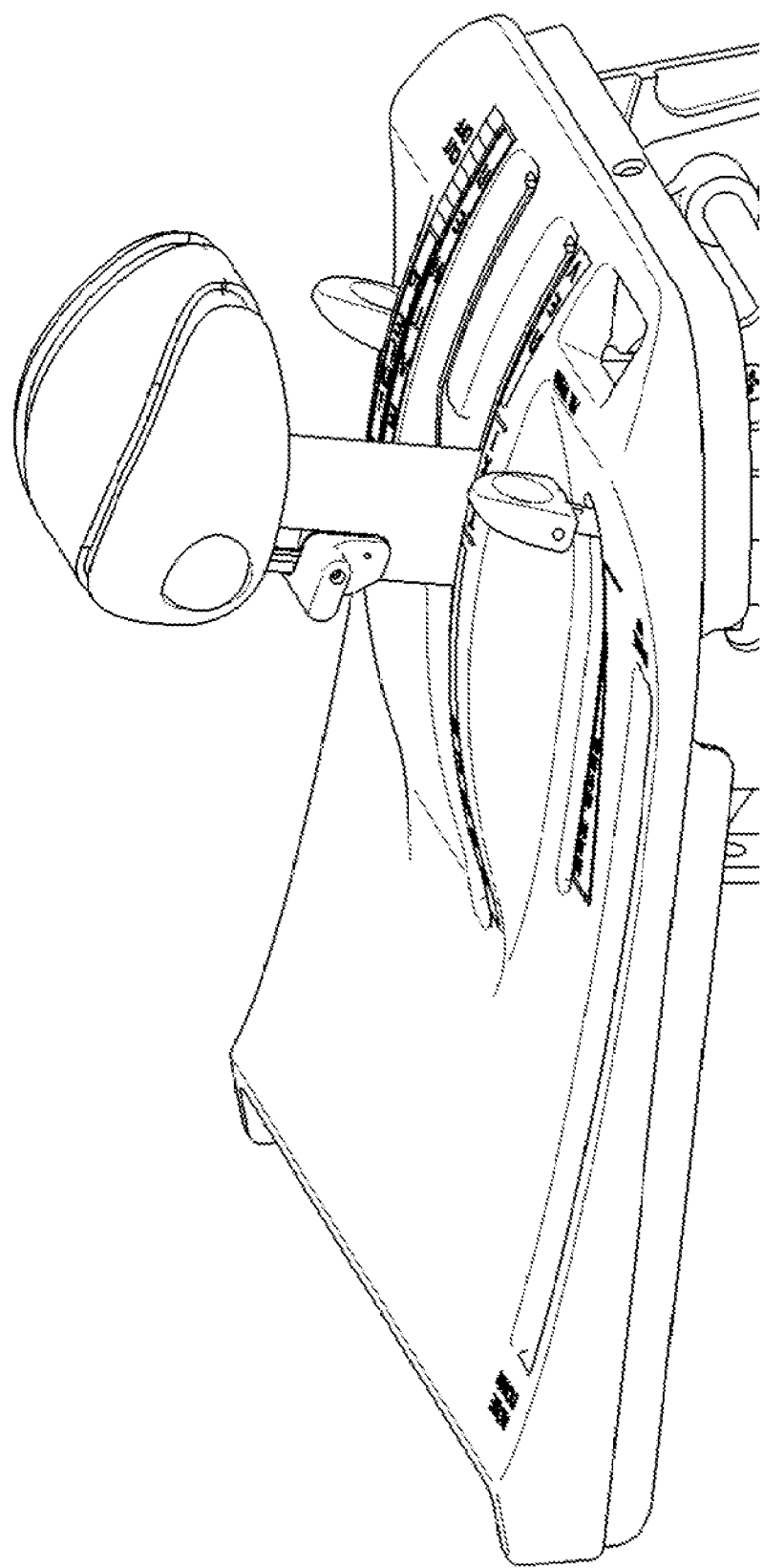
FIG. 9 shows a lever being returned to a flight idle position of the flight mode in accordance with example embodiments.

FIGS. 8A-B illustrate movement of the lever 102 to a maximum forward thrust position in accordance with example embodiments. As can be seen in FIG. 8B, rotation of the lever 102 about rod 210 relative to axis 250 causes the power roller 306 to move within track 708 and the thrust reverse roller 308 to move within track 706. FIG. 9 shows the lever 102 being returned to the flight idle position.

Figure 10A:
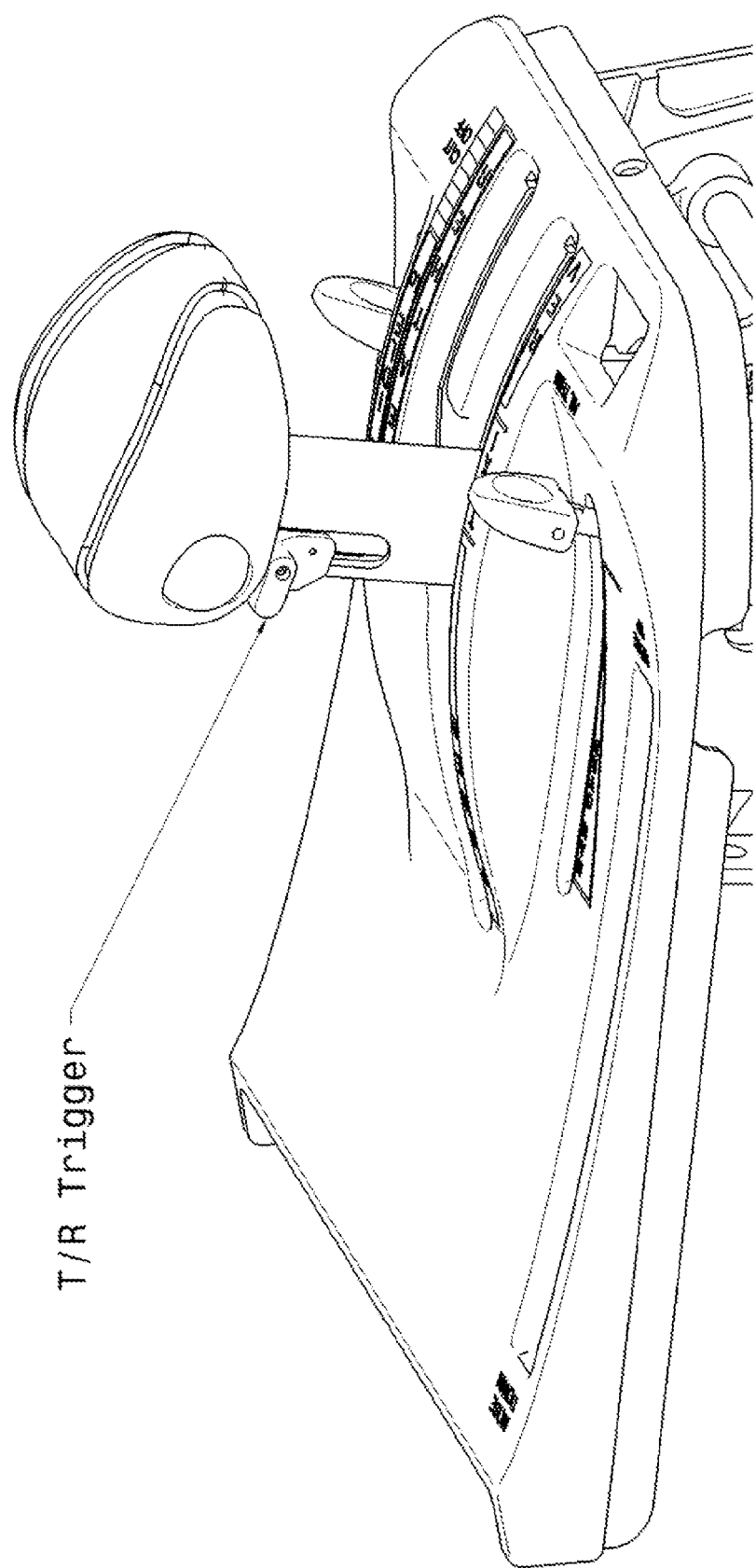
FIGS. 10A-C illustrate a lever in a reverse engine thrust position of the flight mode in accordance with example embodiments.
Figure 10B:
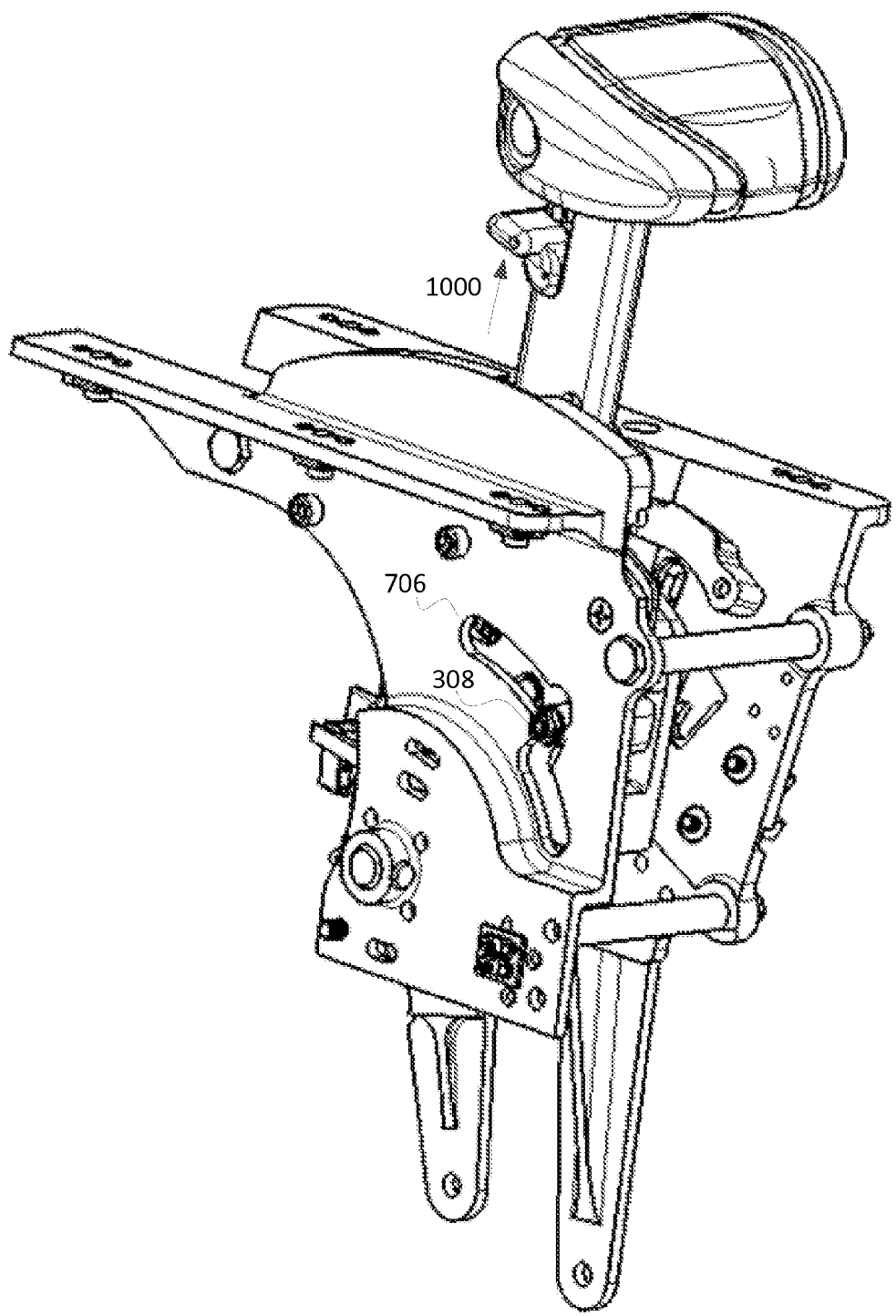
Figure 10C:
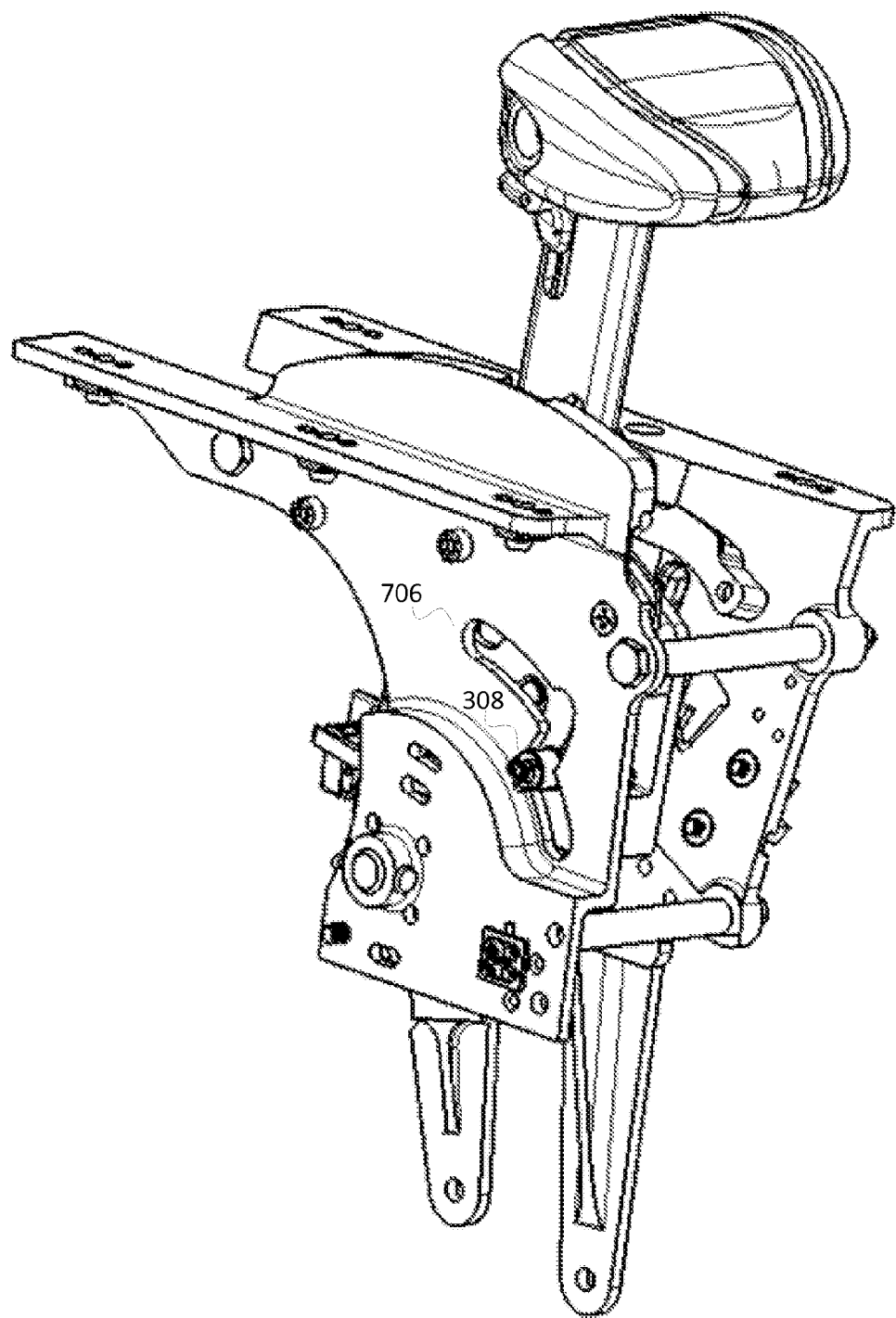
Figure 11:
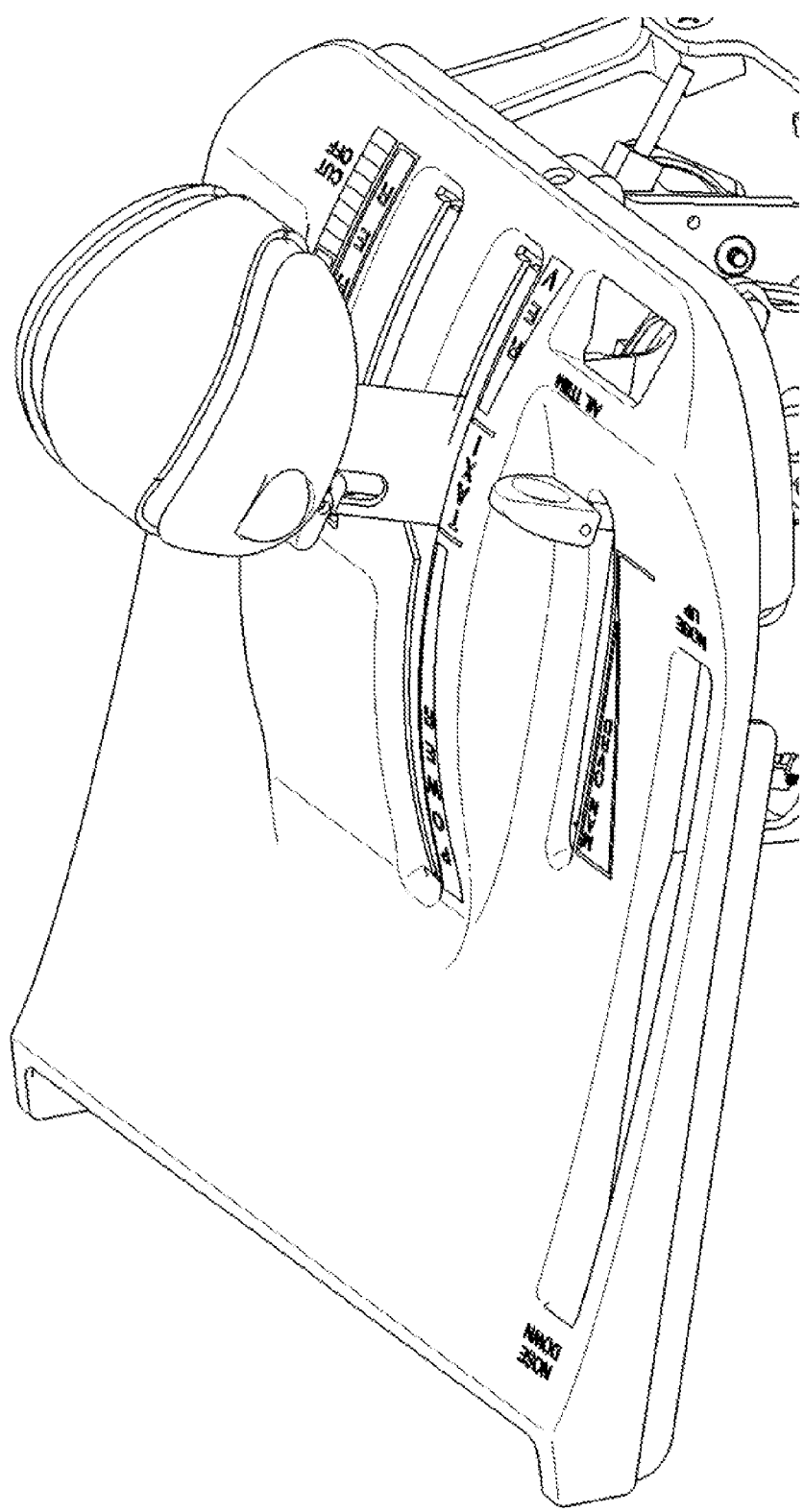
FIG. 11 depicts a lever in a taxiing position of the flight mode in accordance with example embodiments.
Figure 12A:
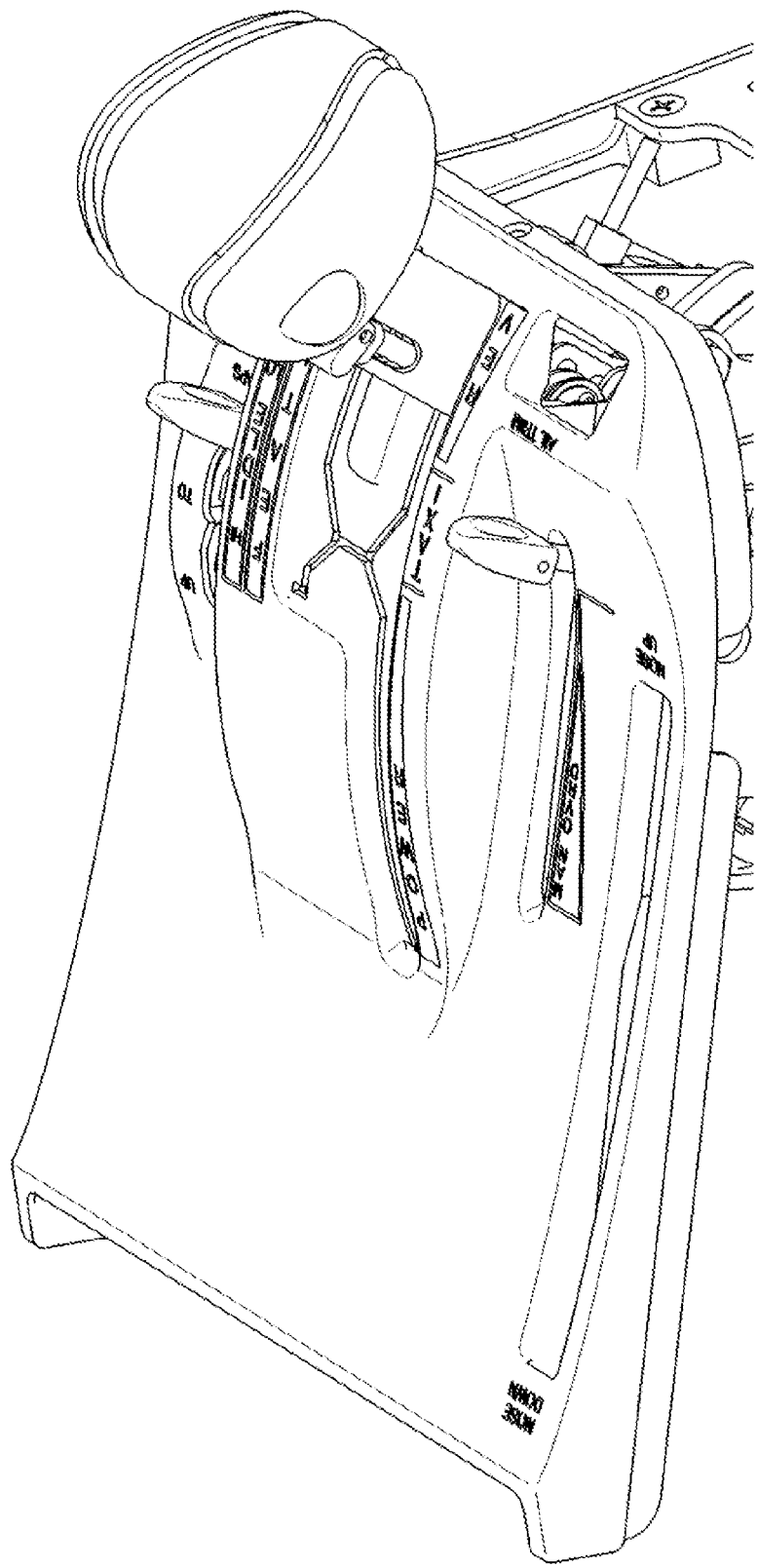
FIGS. 12A-B depict a lever in a reverse thrust position of the flight mode in accordance with example embodiments.
Figure 12B:
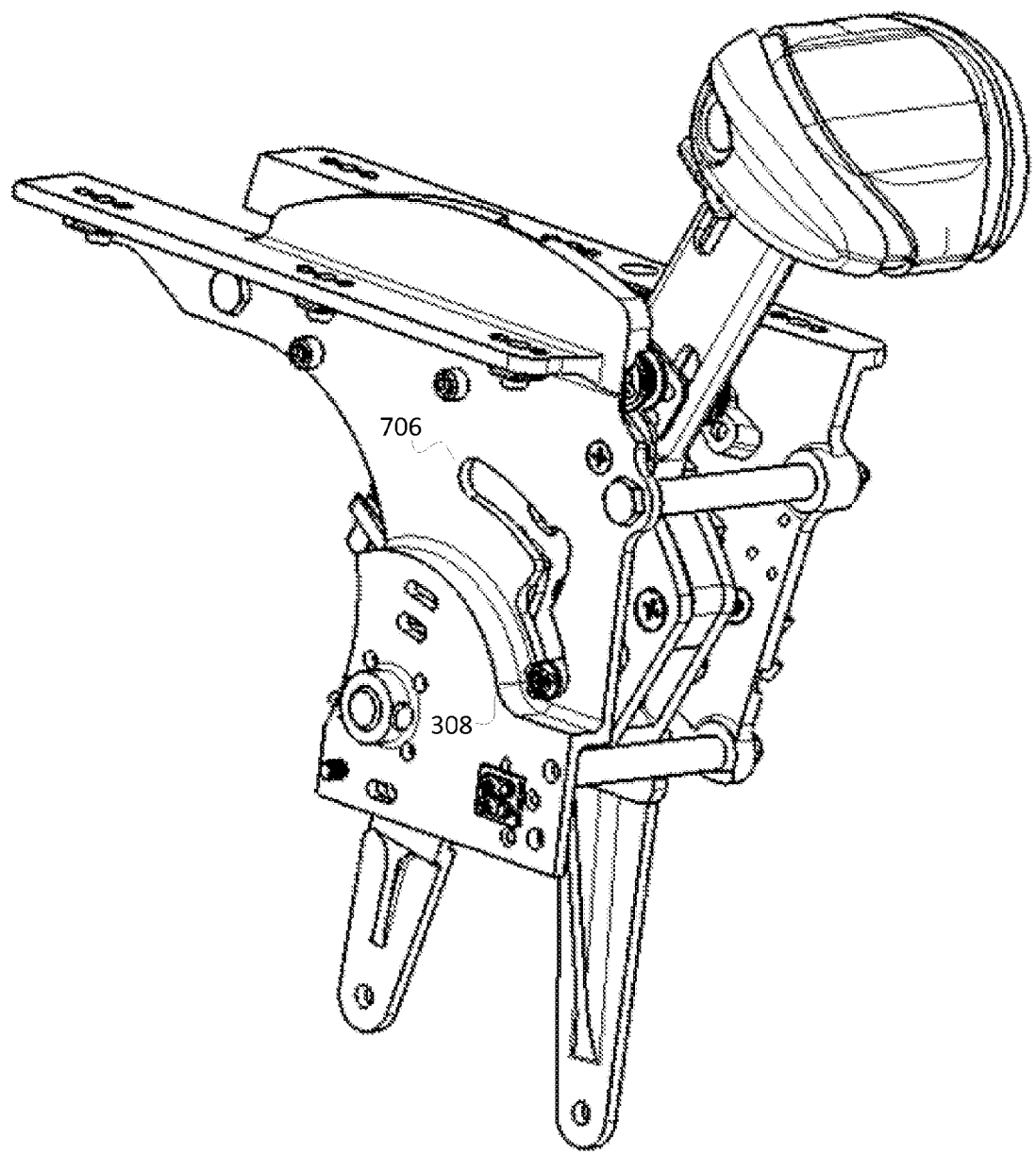
Figure 13:
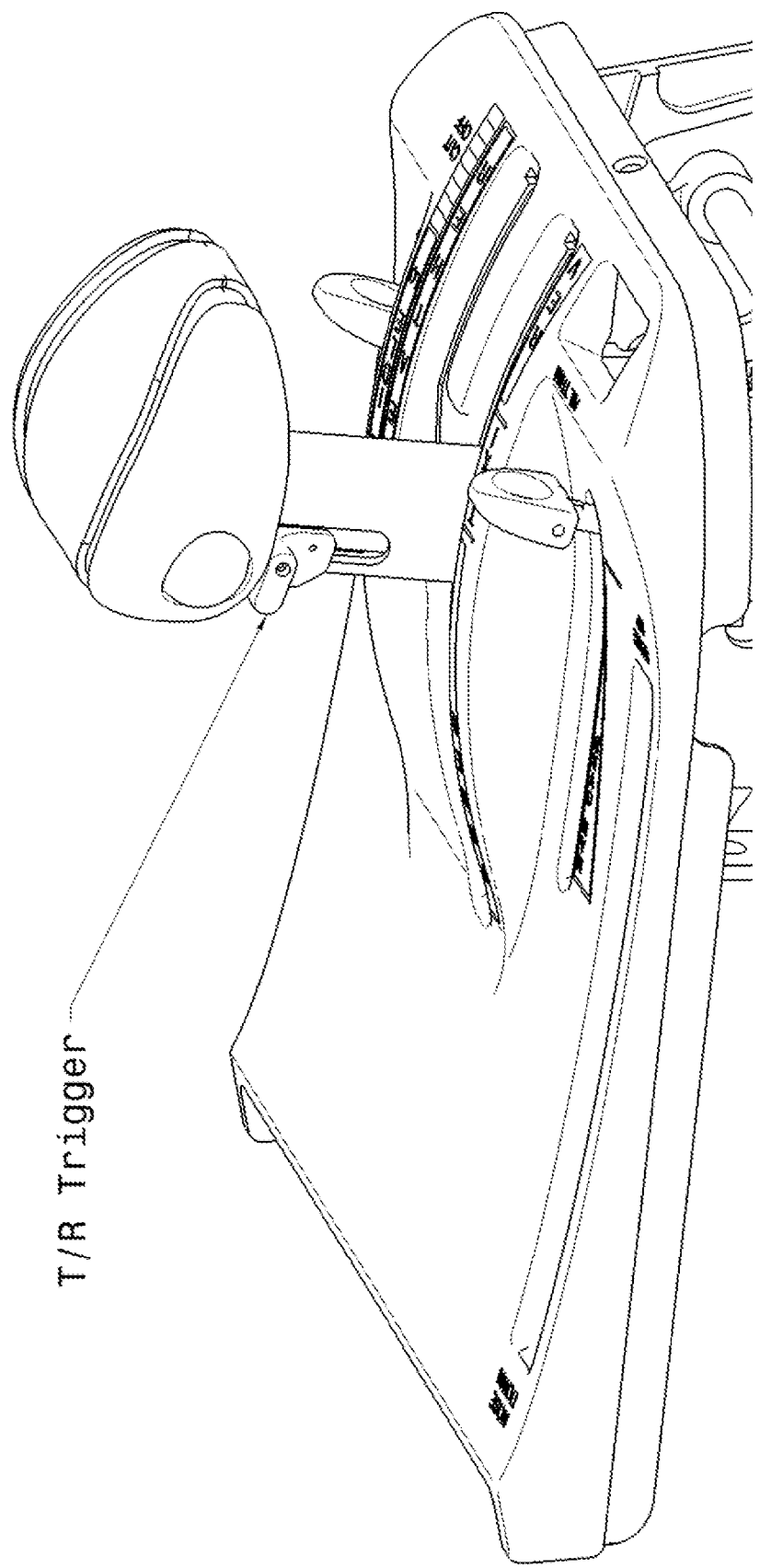
FIG. 13 illustrates movement of a lever to a flight idle position in accordance with example embodiments.
Figure 14:
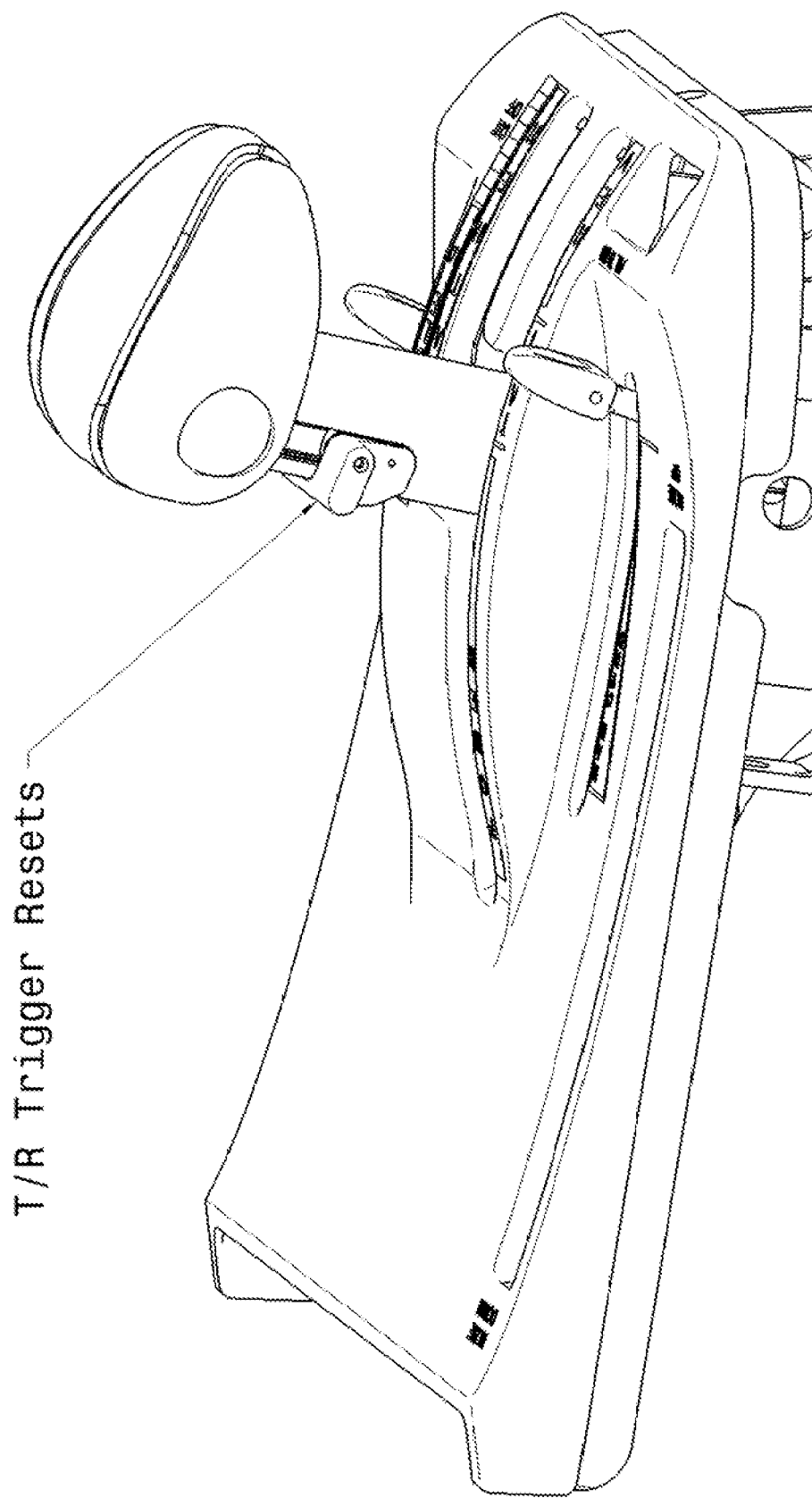
FIG. 14 illustrates resetting a safety gate of a lever in accordance with example embodiments.

FIGS. 10A-C illustrate rotations of the lever 102 to a reverse engine thrust position in accordance with example embodiments. In FIGS. 10A-C, a pilot may move thrust reverse trigger 302 upward in direction 1000 releasing a safety gate and causing the thrust reverse roller 308 to drop in track 706 from its position shown in FIG. 10B to the position shown in FIG. 10C. This permits backward movement of the lever 102 within the lower section of thrust reverse track 706 for taxiing and reversing engine thrust. FIG. 11 depicts lever 102 when the aircraft is in a taxiing position. If the lever 102 continues to move backward, as shown in FIGS. 12A-B, the airplane's engine reverses propeller pitch to provide reverse thrust (e.g., to stop an aircraft more quickly when landing). FIG. 13 illustrates movement of the lever 102 back to a flight idle position and, as seen in FIG. 14, returning to the flight idle position causes the thrust reverse trigger 302 to automatically move downward to reset a safety gate and prevent unintentional movement of the lever 102 backward (unless the pilot again actuates the thrust reverse trigger 302).

Figure 15:
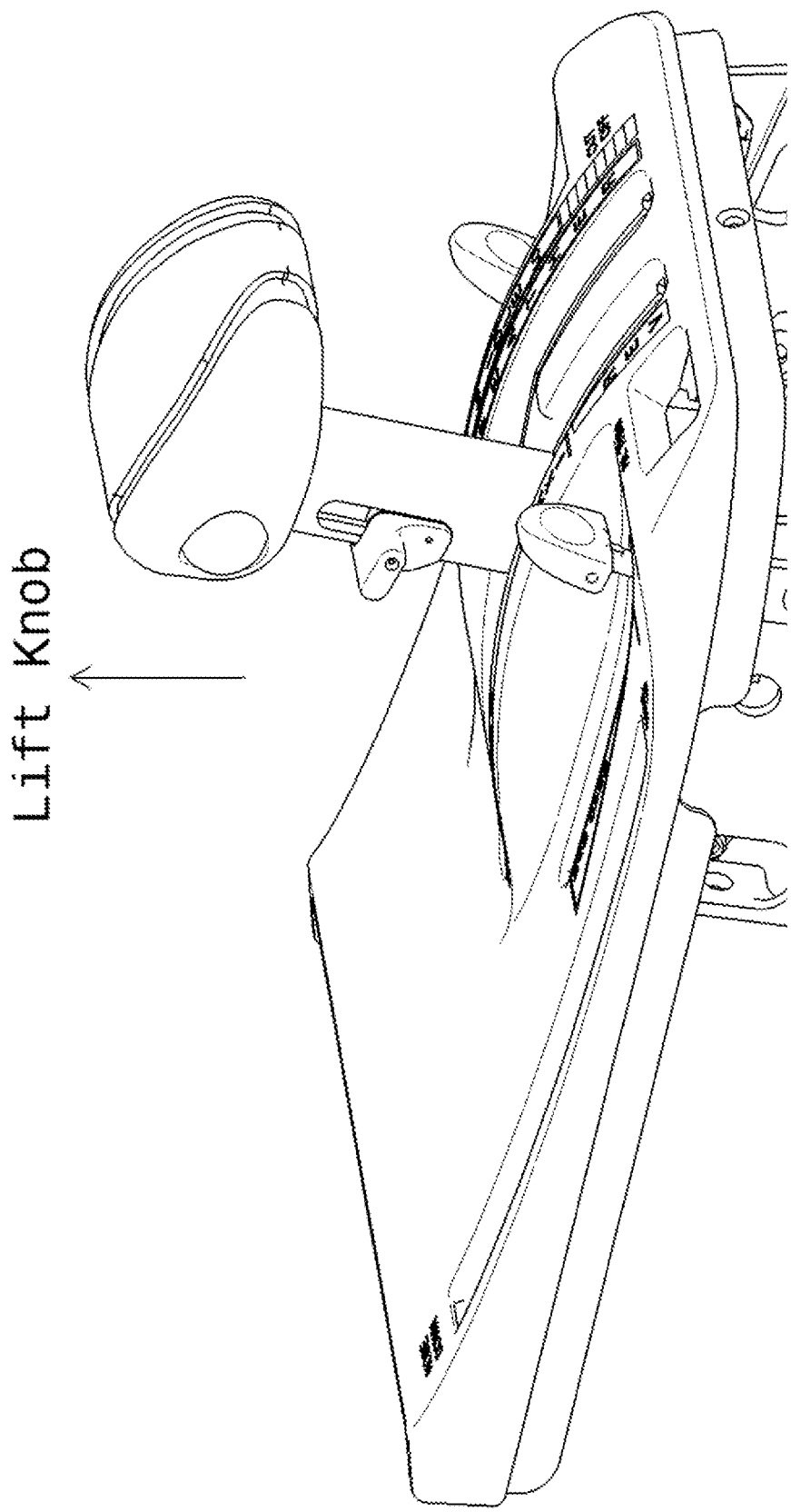
FIG. 15 illustrates an example of releasing a safety gate of a lever in accordance with example embodiments.

At some time, a pilot may desire to exit flight mode and reenter the feather mode (e.g., when parking the aircraft after flight). To do so, the pilot may rotate lever 102 about rod 216 toward the CCC mechanism 170 and away the PCC mechanism 150. To transition from the flight to feather mode, the pilot may raise the knob of lever 102 a predetermined amount (e.g., ⅜ inch) to release a safety gate to permit the lever 102 to rotate about rod 216. If not raised, the safety gate may prevent such rotation. FIG. 15 illustrates an example of releasing a safety gate of the lever 102 in accordance with example embodiments.

Figure 16A:
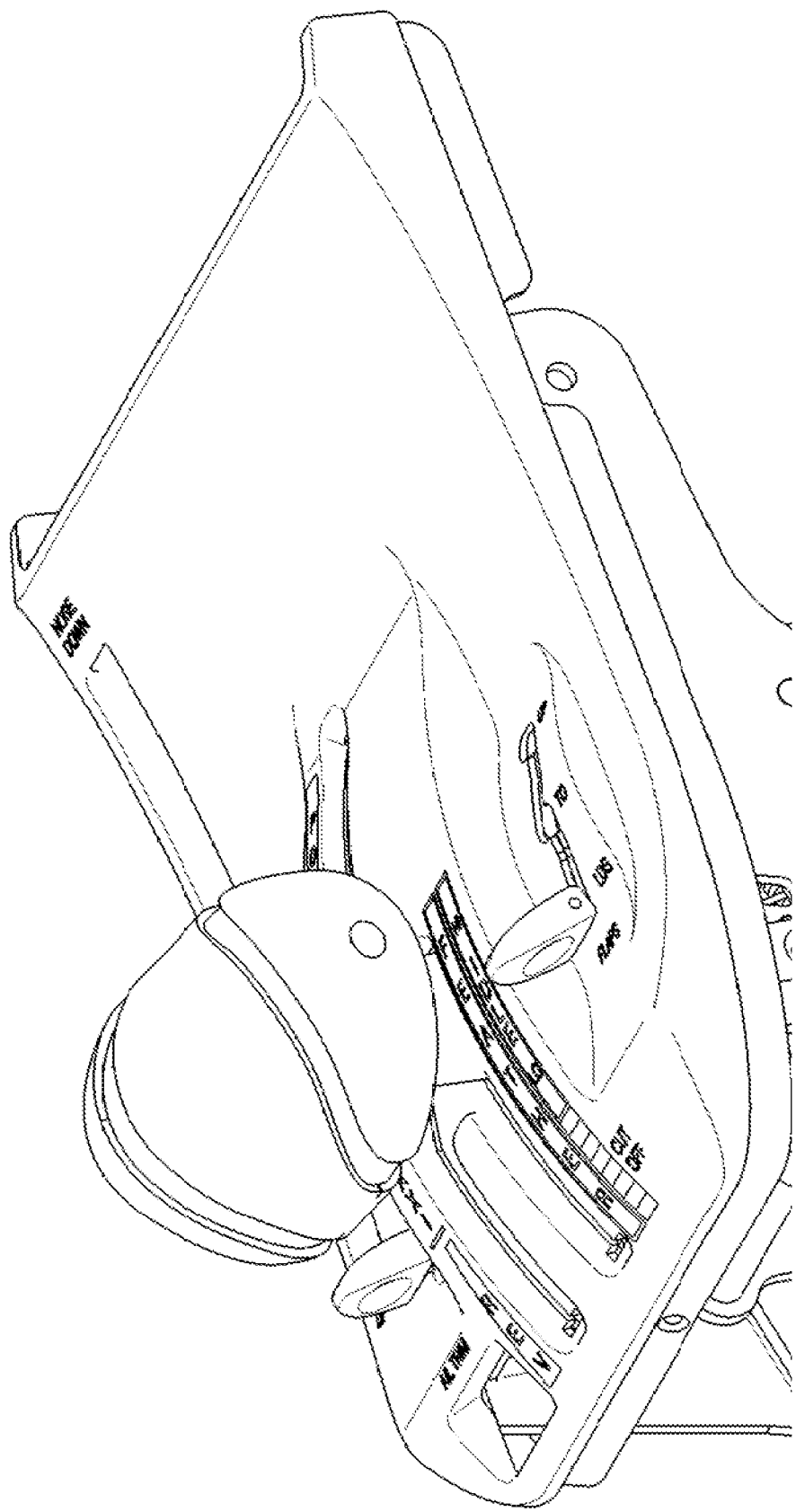
FIGS. 16A-I illustrate moving a lever from flight mode to feather mode in accordance with example embodiments.
Figure 16B:
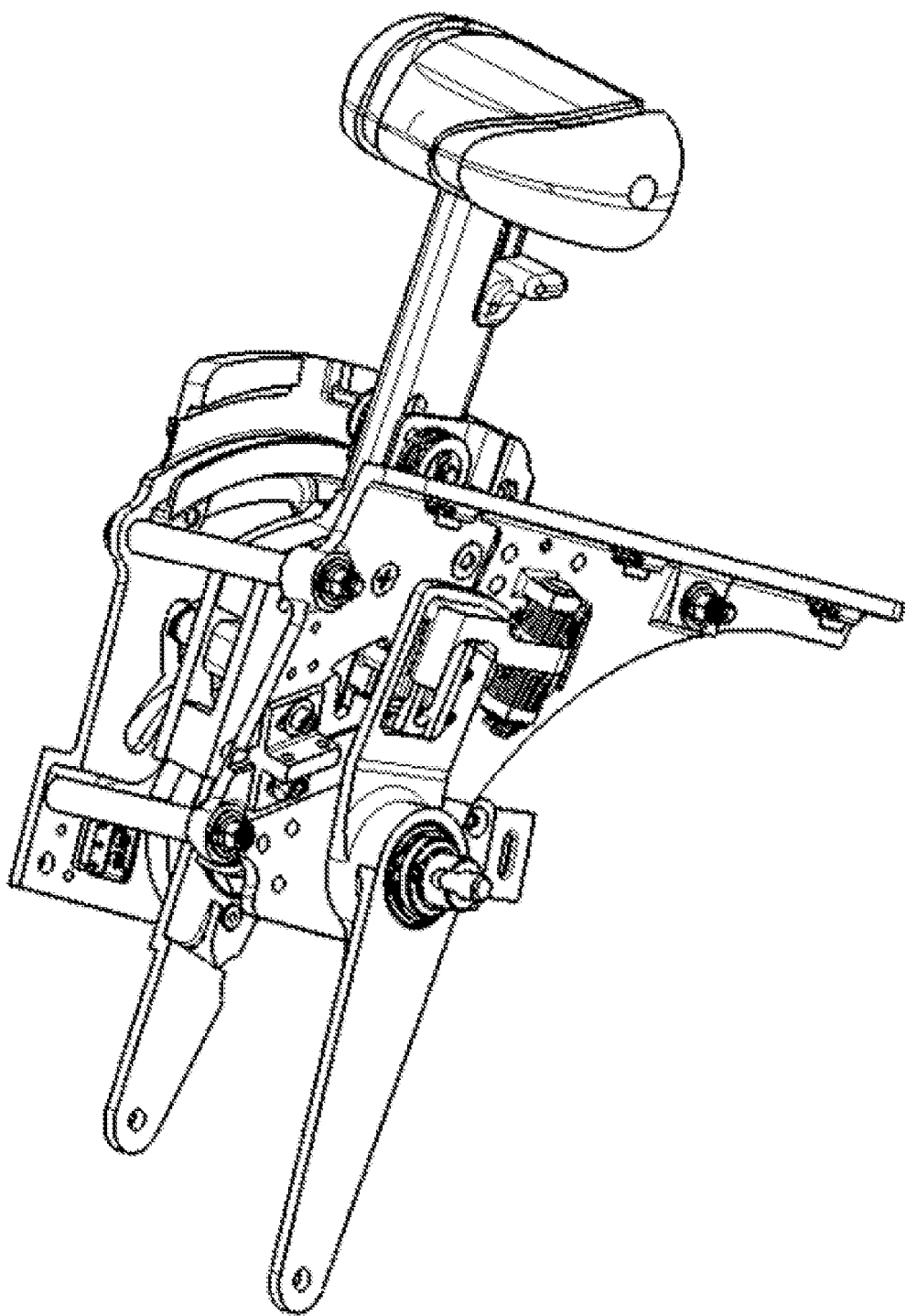
Figure 16C:
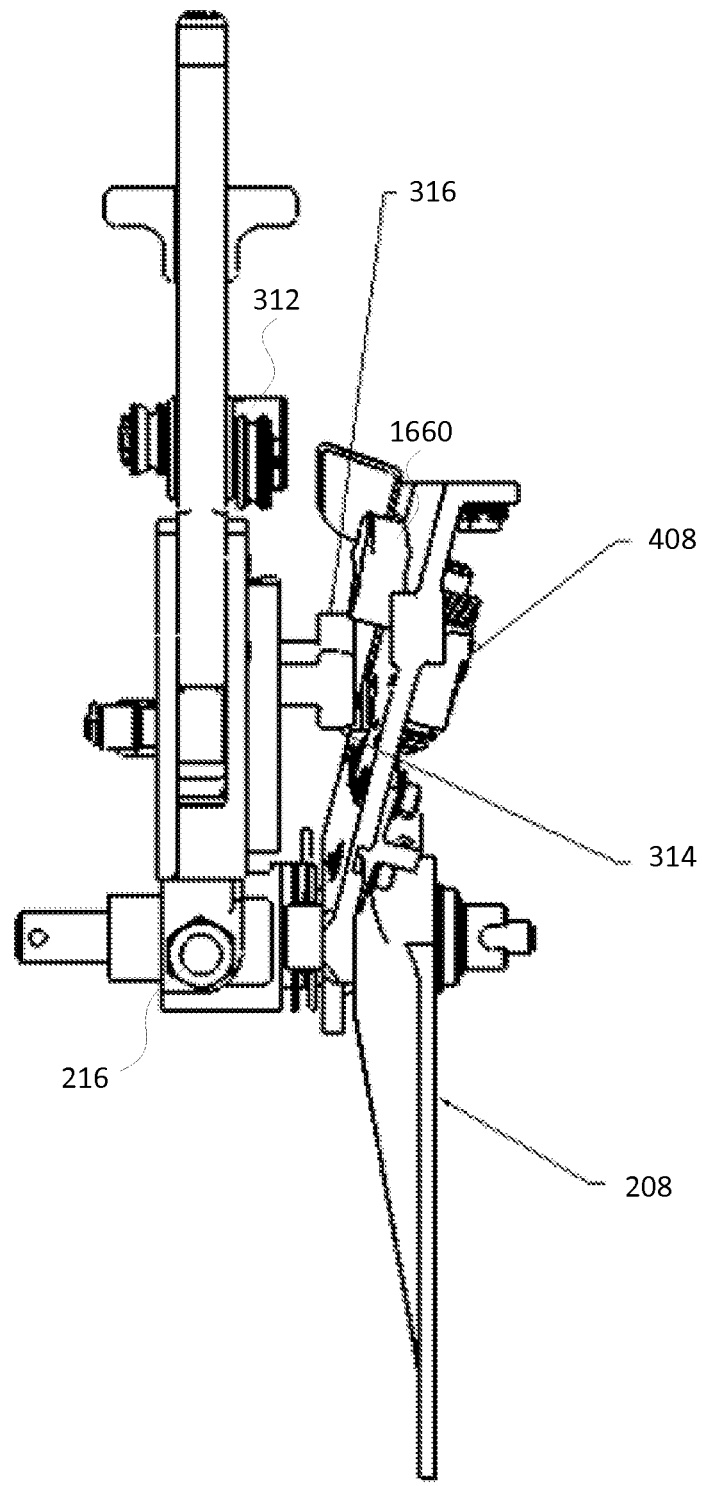
Figure 16D:
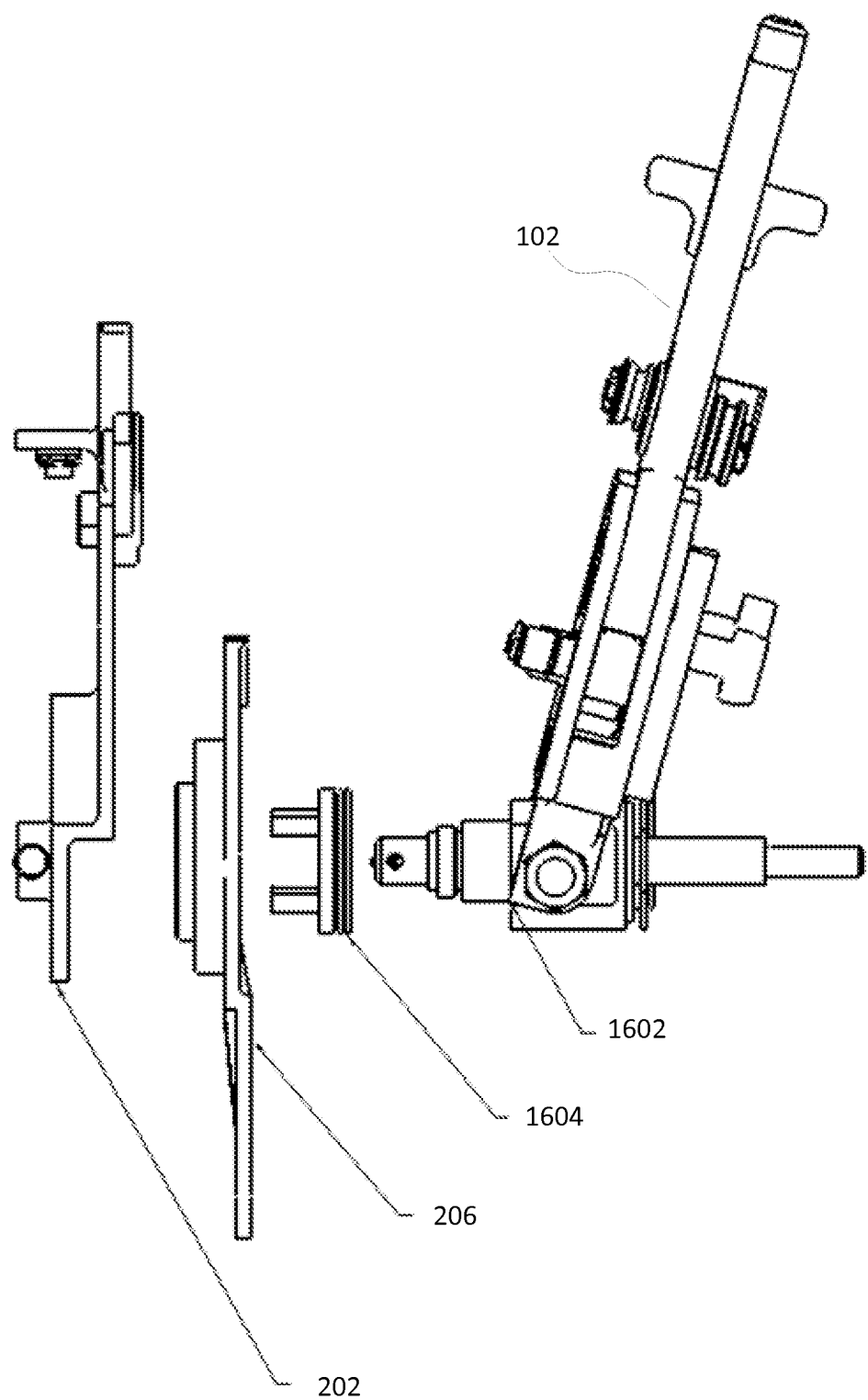
Figure 16E:
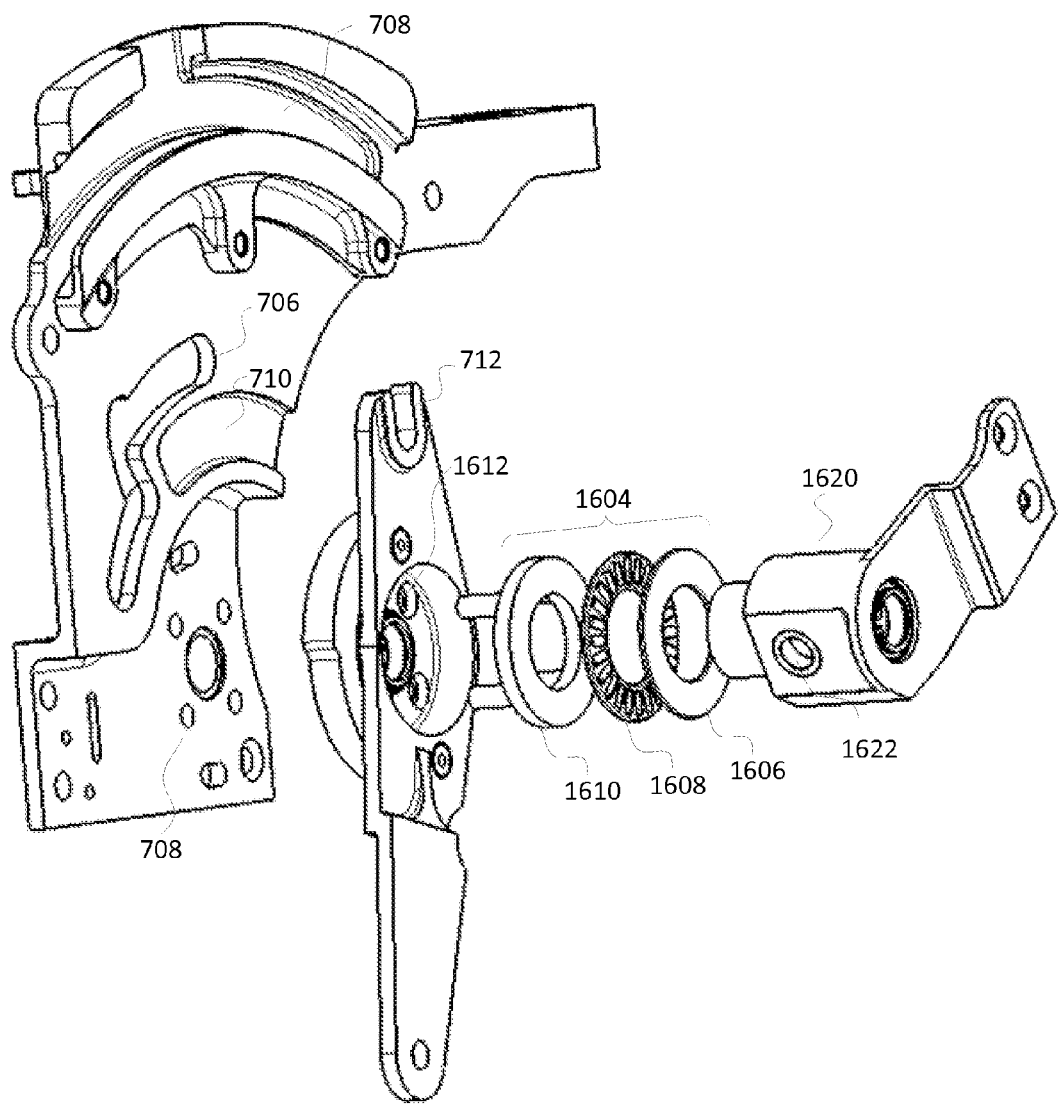
Figure 16F:
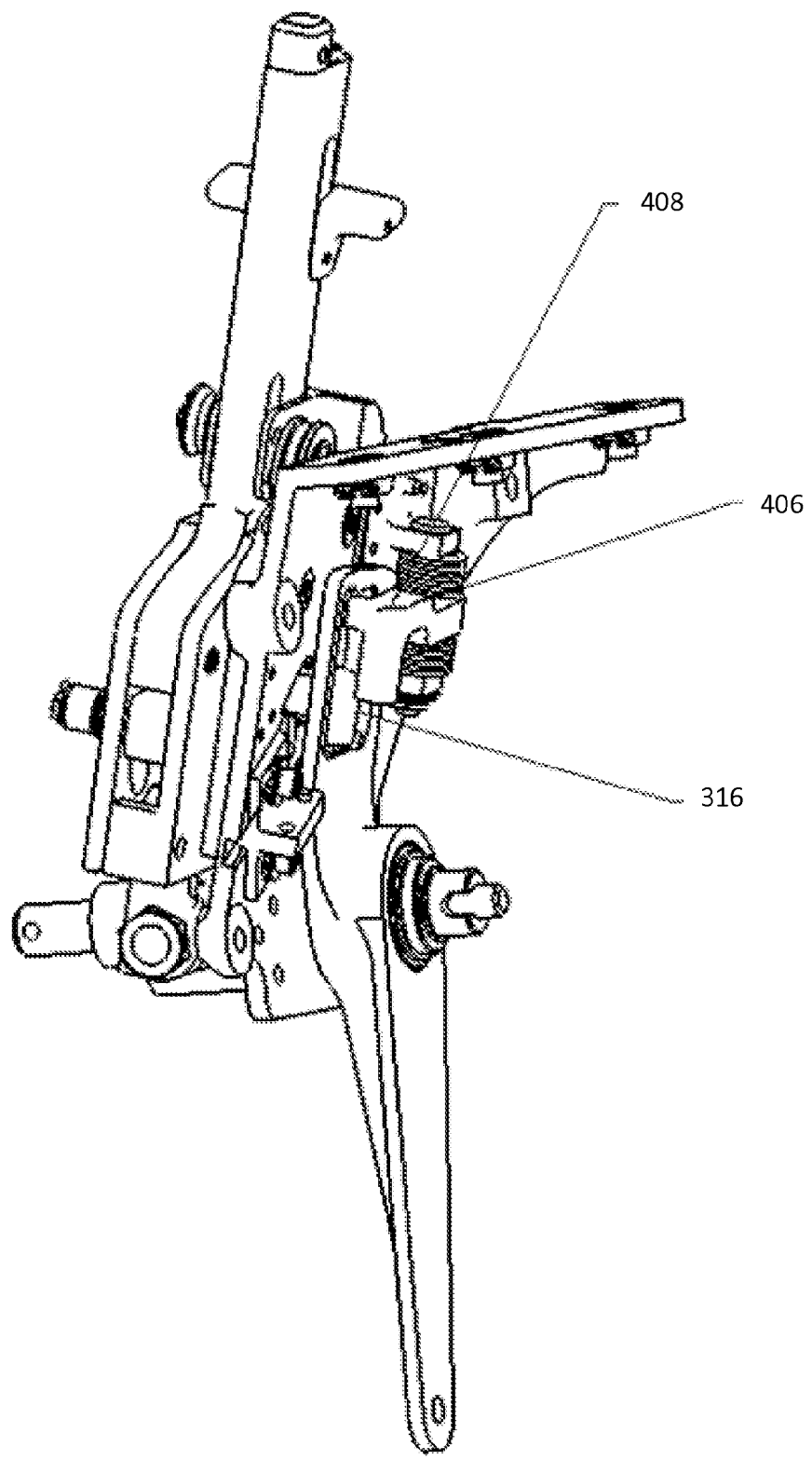
Figure 16G:
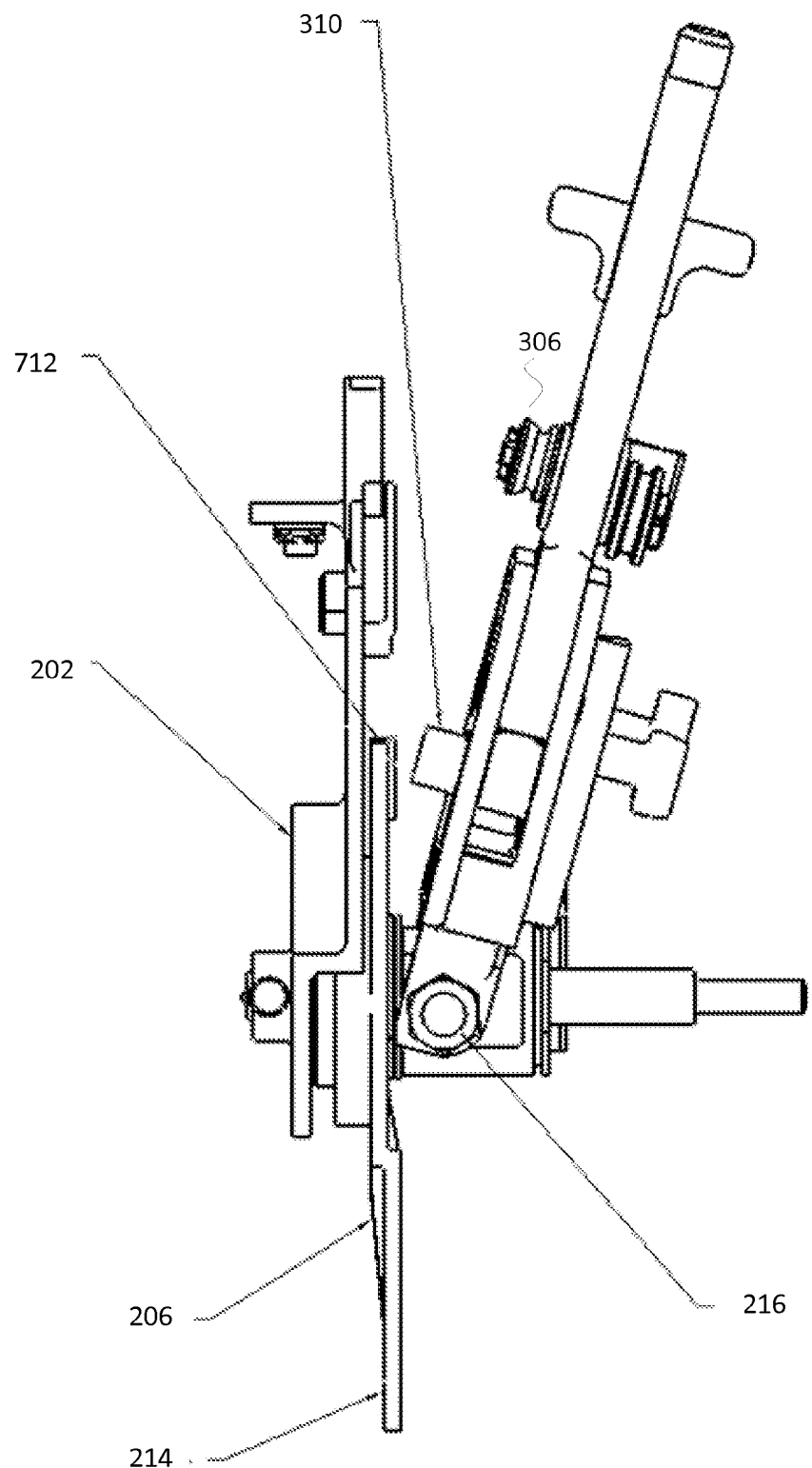
Figure 16H:
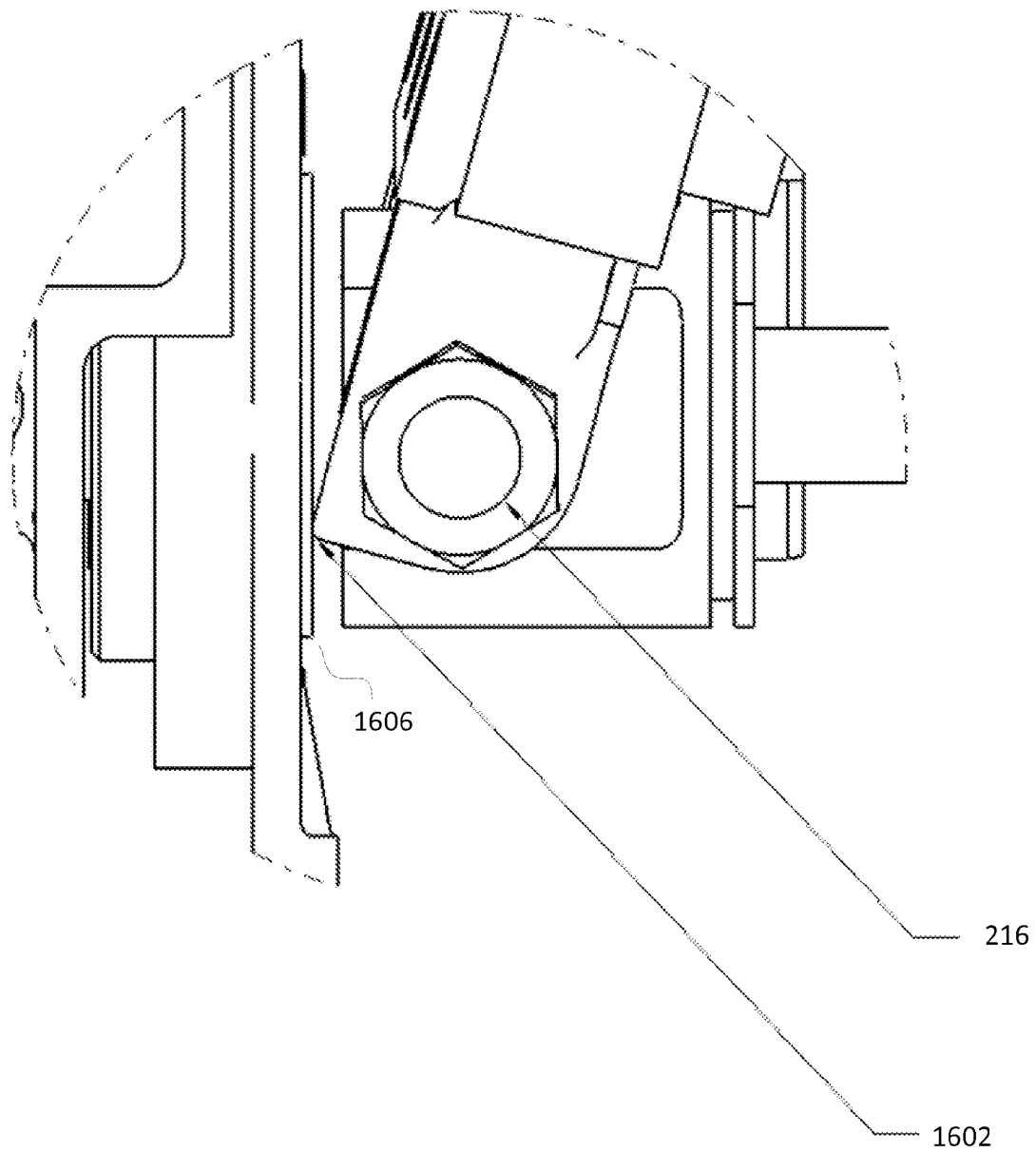
Figure 16I:
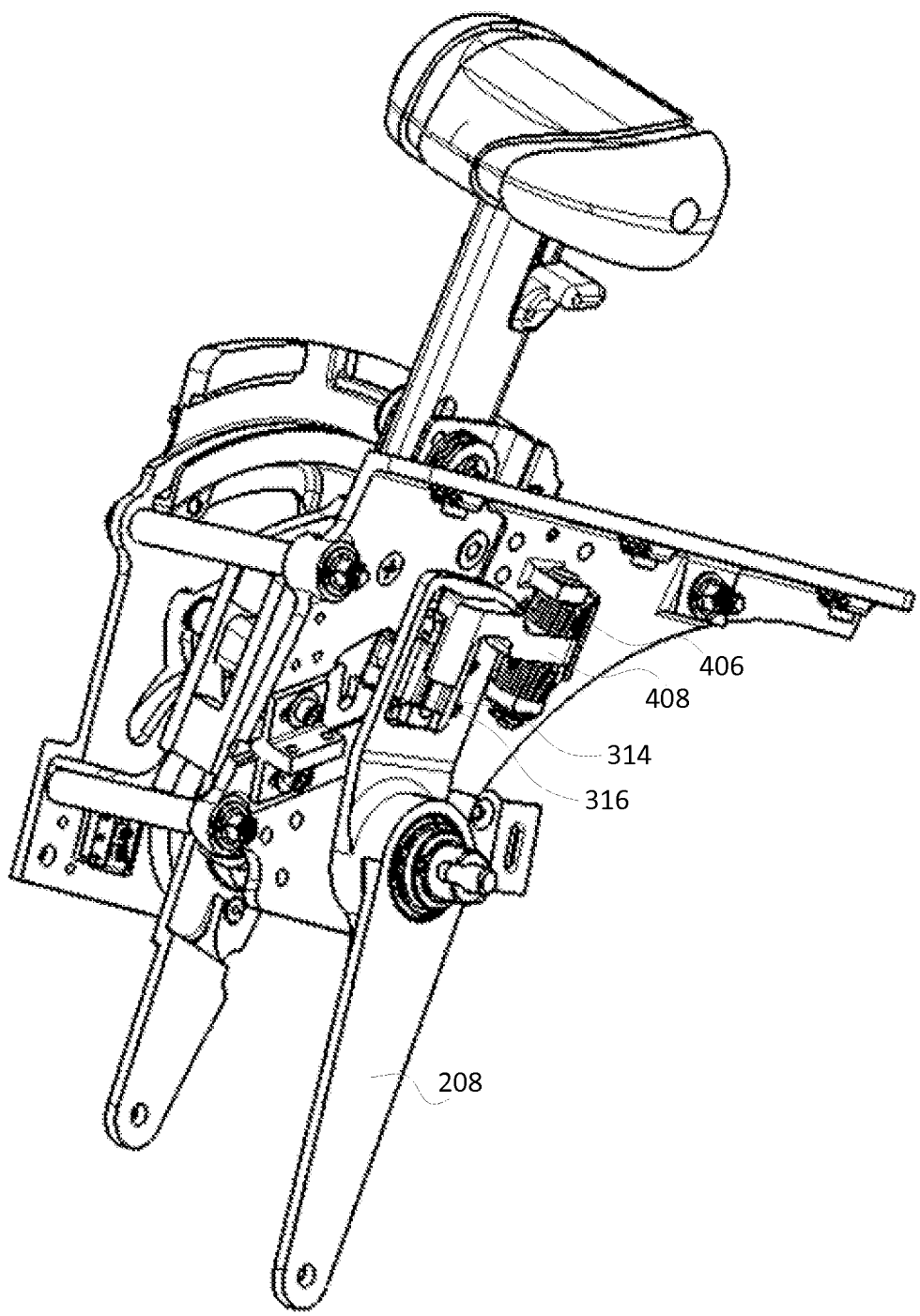

FIGS. 16A-I illustrate rotation of lever 102 from flight mode to feather mode in accordance with example embodiments. This rotation causes the PCC mechanism 150 to lock the power cable 240 to substantially prevent the cable 240 from moving. FIG. 16 depicts the lever 102 in the feather mode, and FIG. 16B provides an isometric view of the lever 102 after the lever has been moved to the high idle position of the feather mode. With reference to FIGS. 16C and 16I, the lever 102 rotates about rod 216 during the transition from flight to feather mode. This rotation may cause condition rail 314 and condition pin 316 to insert through the vertical slots 450A-B of condition arm 208 and overcome the bias of biasing device 406 to force the condition latch 408 out of slot 450A. When fully inserted, condition roller 312 may roll along a condition track 1660 that defines a path of lever 102 in the feather mode (e.g., to transition between high idle, low idle, and cutoff positions).

Rotation of lever 102 from the flight to feather mode may also cause the PCC mechanism 170 to substantially prevent the power cable 240 from moving while the lever 102 is in the feather mode. FIGS. 16D-E illustrate an exploded view of the PCC mechanism 170. When in the feather mode, the PCC 170 may lock the power arm 206 in place to prevent adjustment of the power cable 240. As seen in FIGS. 16G-H, lever 102 may have a cam 1602 that engages with a locking pin 1604 of the PCC mechanism 170 when the lever 102 is rotated about rod 216 away from the PCC mechanism 170. The locking pin 1604 may include a washer 1606, a thrust bearing 1608, and a key 1610. The key 1610 may have two or more legs configured to be inserted through apertures 1612 in the power arm 206 of the PCC mechanism 170 and apertures 714 of the side plate 202 of the PCC mechanism 170. Rod 216 may be inserted through aperture 1622 to attach lever 102 to lever receiver 1620. Rotation of lever 102 about rod 216 away from the PCC mechanism 170 may cause cam 1602 to engage locking pin 1604 and force the legs through apertures 714 and 1612. When inserted through both sets of apertures, the legs may prevent the power arm 206 from rotating about rod 210, even though lever 102 may still rotate about rod 210, and hence the power arm 206 cannot move the power cable 240 when lever 102 is on the right side of the h-shaped pattern. It is noted that the power arm 206 and condition arm 208 may each be attached to rod 210 with rotational bearings and hence each may move independently of lever 102. Thus, locking either arm 206 (e.g., to side plate 202) or arm 208 (e.g., to side plate 204) does not also lock lever 102. When face pressure is applied to bearing 1608 to cause insertion of legs through apertures 714 and 1612, roller bearings between power arm 206 and rod 210 allow rotational movement of lever 102 even when cam 1602 applies side pressure to thrust bearing 1608.

To release the locking pin 1604, the pilot may move the single lever 102 in the opposite direction toward the PCC mechanism 150 (and away from the CCC mechanism 150) and a biasing device (e.g., one or more springs) situated between key 1610 and power arm 206 disengage the legs of key 1610 when the cam 1602 releases pressure on thrust bearing 1608, thereby enabling the single lever 102 to rotate the power arm 206 about rod 210 to adjust the power cable 240 as lever 102 rotates about rod 210.

Figure 17A:
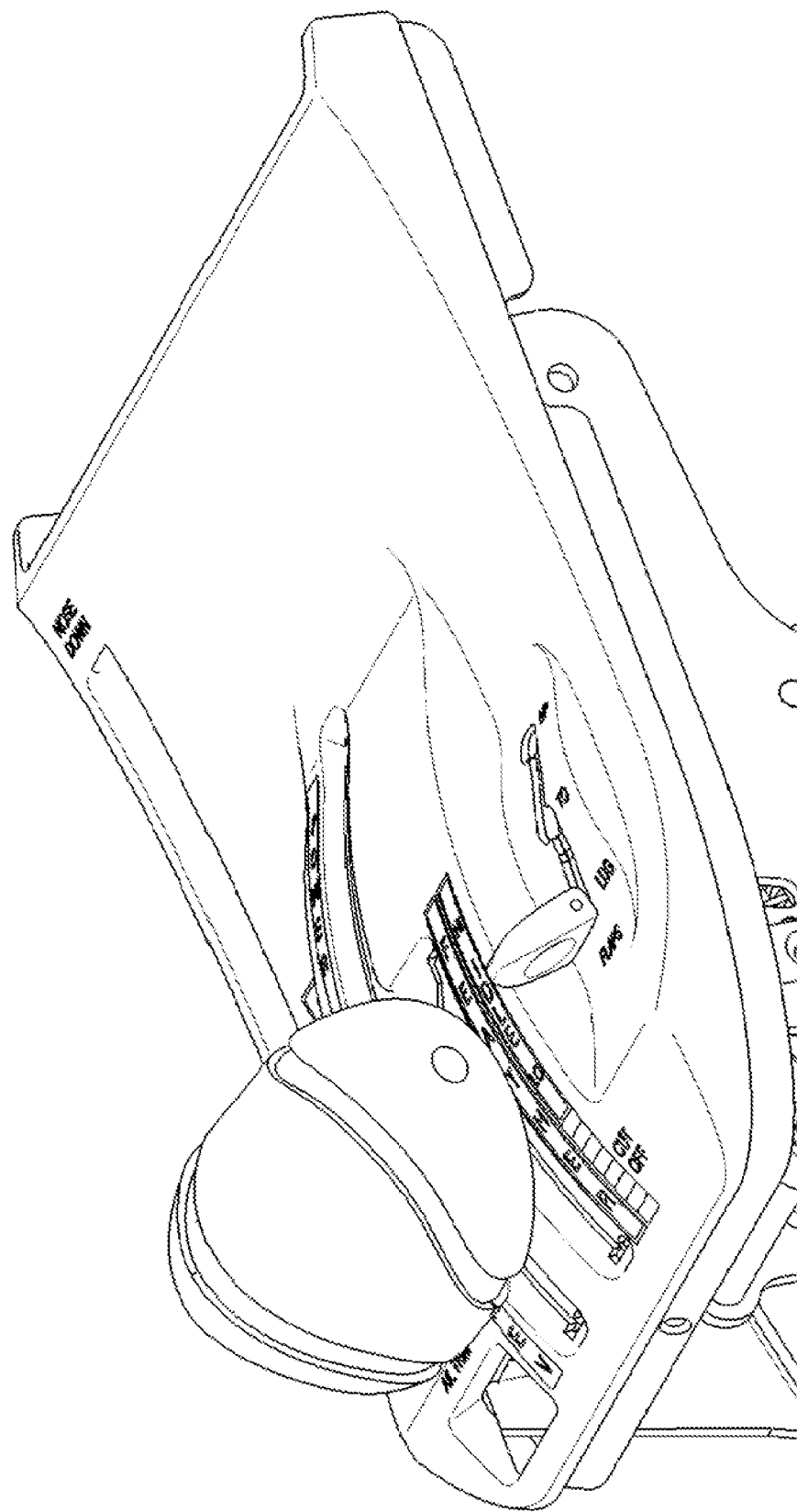
FIGS. 17A-B illustrate moving a lever from the high idle position to the low idle position of the feather mode in accordance with example embodiments.
Figure 17B:
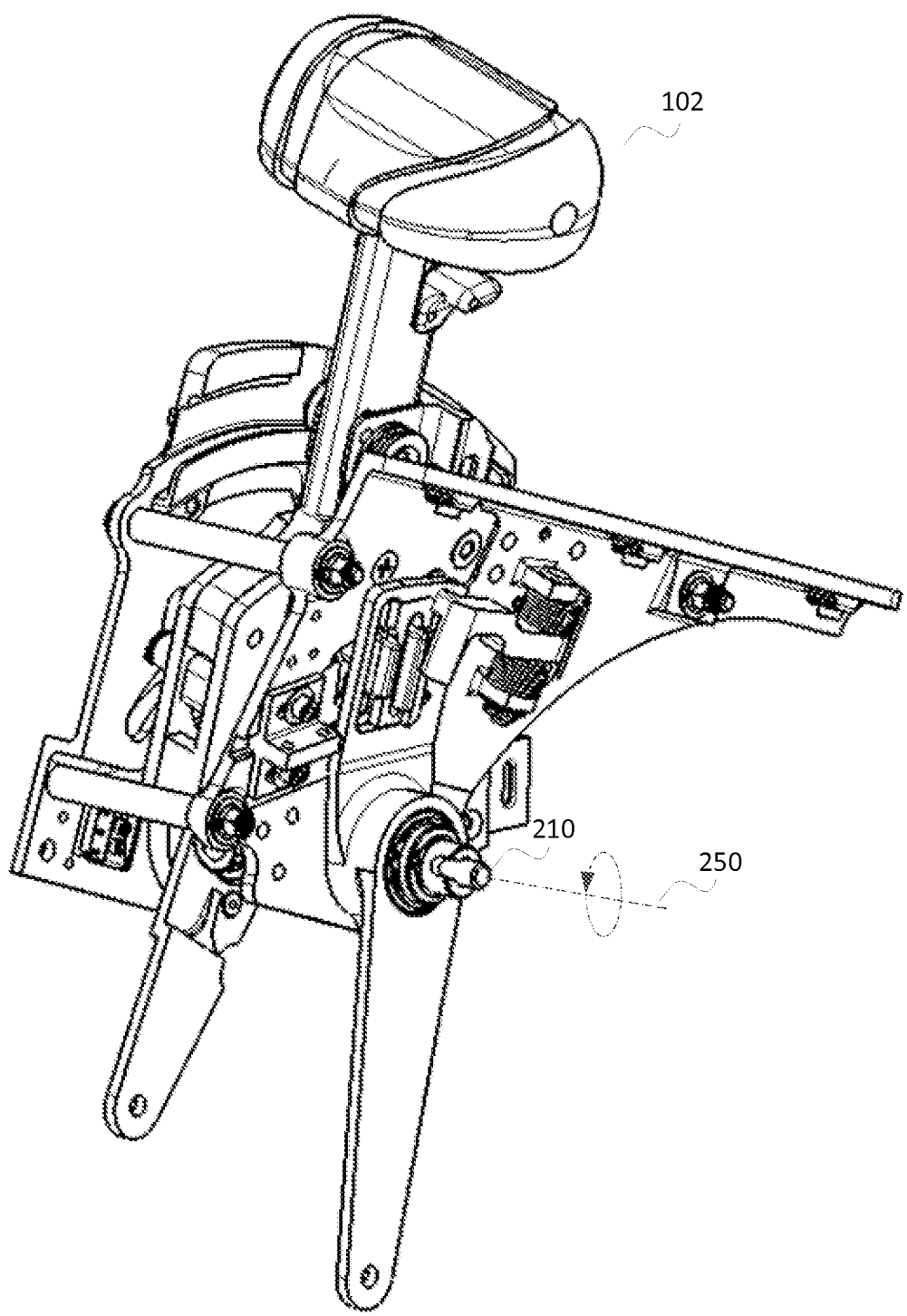
Figure 18A:
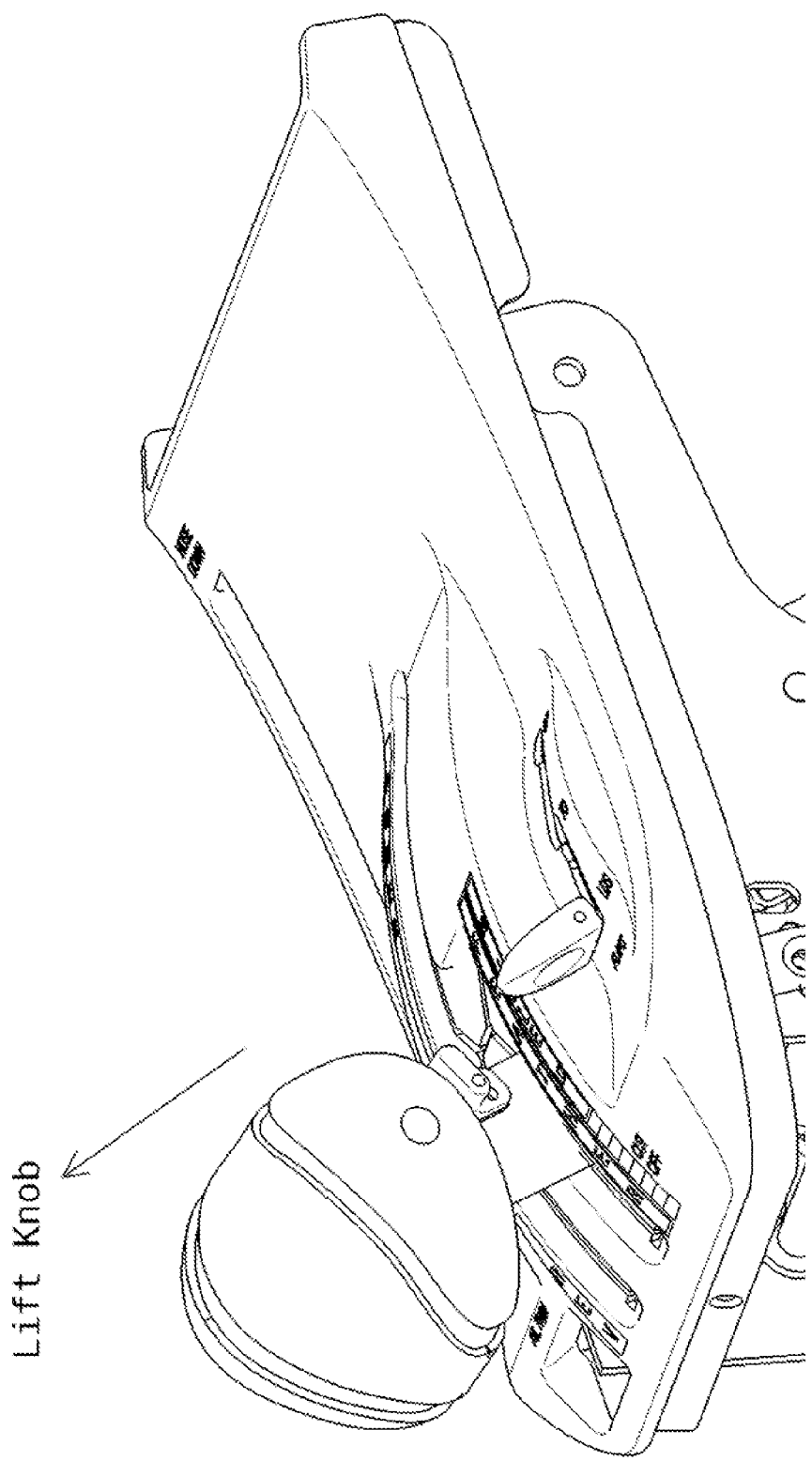
FIGS. 18A-B and 19A-B illustrates moving a lever from the low idle position to a cutoff position of the feather mode in accordance with example embodiments.
Figure 18B:
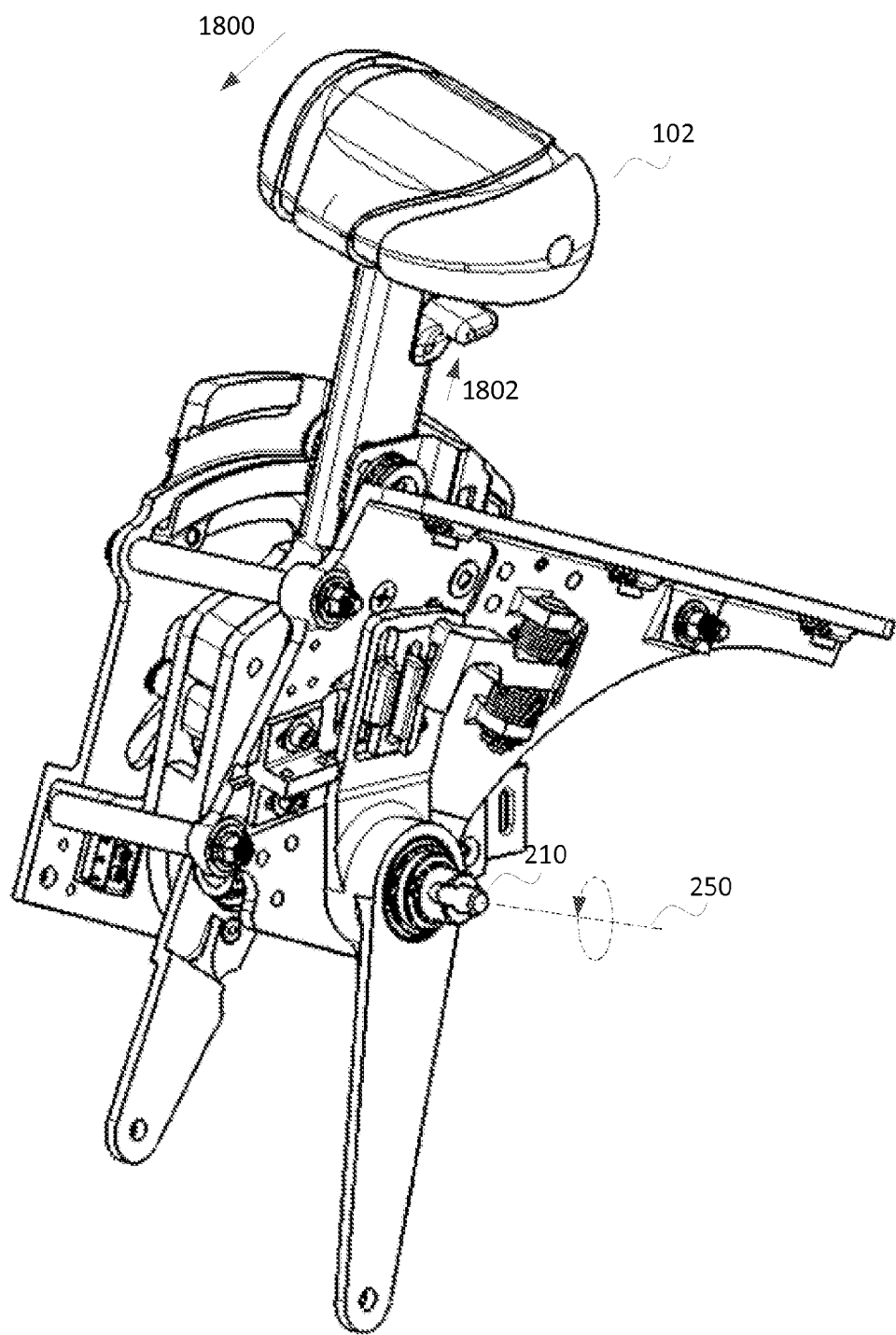
Figure 19A:
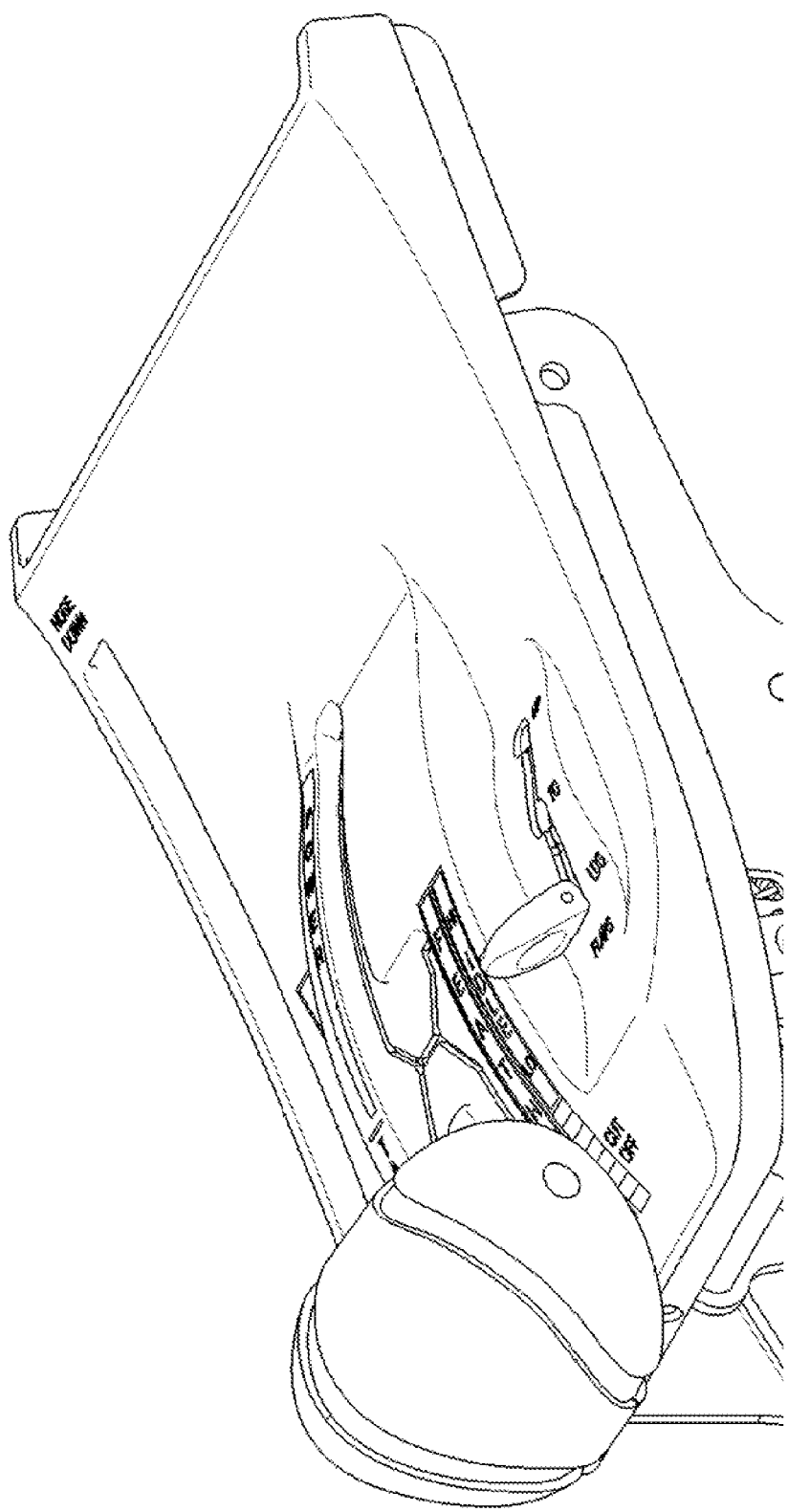
Figure 19B:
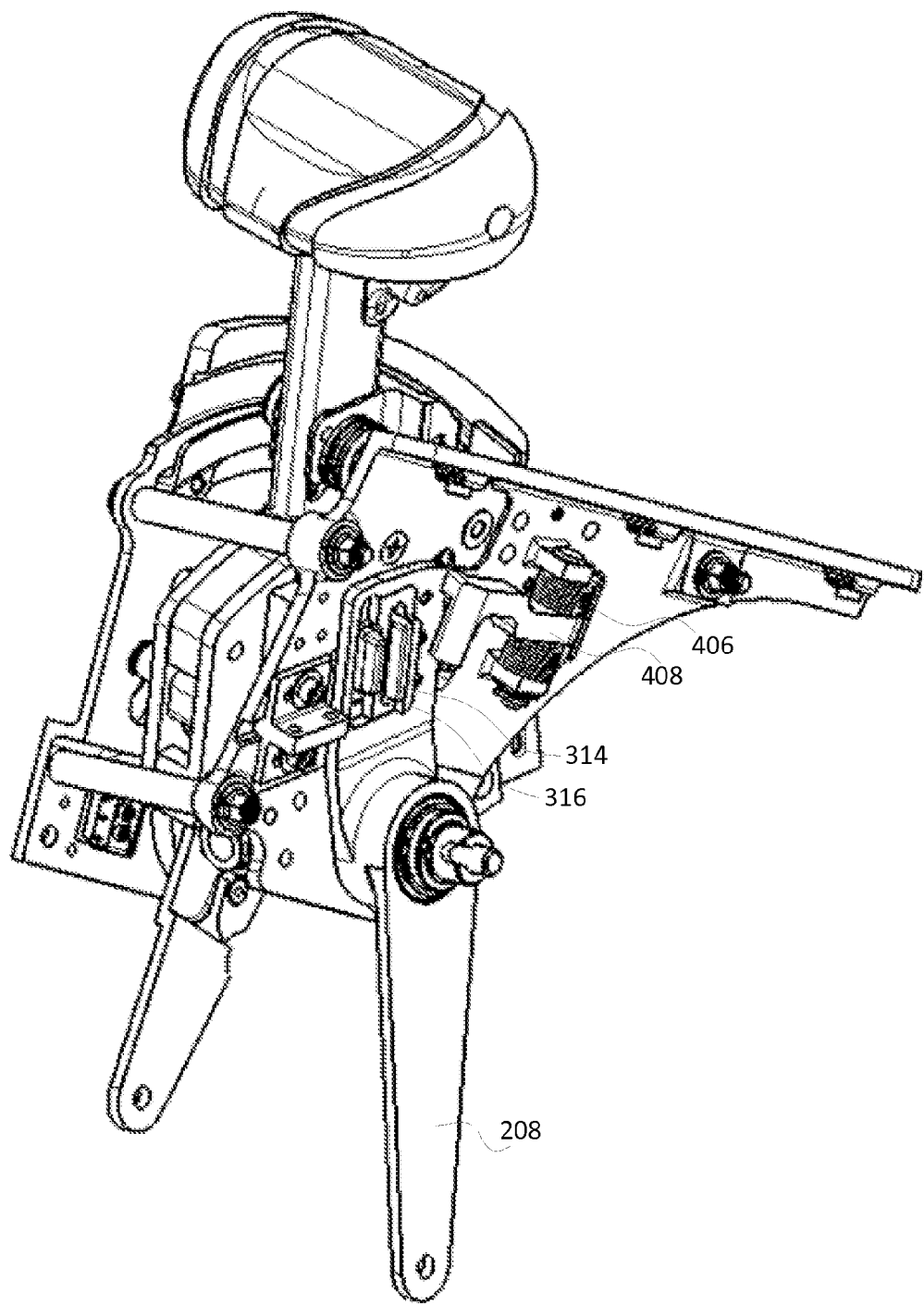

Returning to the example with the locking pin 1604 being inserted in apertures 714 and 1612, as the locking pin is inserted 1604, a safety gate engages to prevent the pilot from moving the lever 102 back to the feather mode without disengaging the safety gate. The pilot may then rotate the lever from the high idle position to the low idle position, as seen in FIGS. 17A-B, and a safety gate 732 (see also FIG. 7E) may prevent the pilot from entering the cutoff position. With reference to FIGS. 18A-B and 19A-B, a pilot may lift knob in direction 1802 to clear the cutoff safety gate 732 to permit lever 102 to rotate further backward in direction 1800 to transition from the low idle position to the cutoff position of the feather mode for turning off the airplane's engine. Once in the cutoff position the knob of lever 102 may reset to close a safety gate to lock lever 102 in the cutoff position to prevent movement of lever 102 back into the low idle position until the pilot actuates the safety gate.

Advantageously, single lever 102 translates single input from a pilot into movement of two output arms to operate two different cables that respectively control condition (e.g., fuel) and power (e.g., thrust). With a single lever it is practically impossible for the pilot to inadvertently move the wrong cable, thereby improving aircraft safety and reliability, and pilot comfort.

While the example embodiments have been discussed in relation to a single control lever for an aircraft, the example embodiments may be used to control other types of vehicles and may be implemented in non-vehicular settings.

The example embodiments may include additional devices and systems beyond those disclosed. Further, the functionality described as being performed by one device may be distributed and performed by two or more devices. Multiple devices may also be combined into a single device, which may perform the functionality of the combined devices.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, systems and methods described herein may be configured to improve control levers. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed:

1. A single control lever system comprising:
a condition cable controlling mechanism configured for controlling adjustment of a condition cable, the condition cable controlling mechanism including a condition arm having a slot therein and being coupled to the condition cable, a condition latch, and a biasing device configured to bias the condition latch toward the condition arm;
a power cable controlling mechanism configured for controlling adjustment of a power cable;
a single lever coupled to the condition cable controlling mechanism and to the power cable controlling mechanism, the single lever including a condition pin and a condition rail;
a first rod providing a first axis of rotation about which the single lever is configured to rotate; and
a second rod providing a second axis of rotation about which the single lever is configured to rotate, wherein the first axis differs from the second axis;
wherein, during manipulation of the single lever to control adjustment of the power cable, the condition cable controlling mechanism is configured to prevent adjustment of the condition cable, and
wherein, during manipulation of the single lever to control adjustment of the condition cable, the power cable controlling mechanism is configured to prevent adjustment of the power cable.

2. The system of claim 1, wherein rotation of the single lever about the second rod toward the condition cable controlling mechanism inserts the condition pin into the slot and forces the condition latch out of the slot to overcome bias of the biasing device to permit the single lever to rotate the condition arm about the first rod to adjust the condition cable.

3. The system of claim 1, wherein rotation of the single lever about the second rod away from the condition cable controlling mechanism removes the condition pin from the slot and the biasing device biases the condition latch into the slot to lock the condition arm to prevent rotation of the condition arm, thereby preventing adjustment of the condition cable when the single lever rotates about the first rod.

4. A single control lever system comprising:
a condition cable controlling mechanism configured for controlling adjustment of a condition cable;
a power cable controlling mechanism configured for controlling adjustment of a power cable, wherein the power cable controlling mechanism comprises a side plate having a plurality of first apertures, a locking pin, and a power arm having a plurality of second apertures;
a single lever coupled to the condition cable controlling mechanism and to the power cable controlling mechanism, wherein the single lever comprises a cam;
a first rod providing a first axis of rotation about which the single lever is configured to rotate; and
a second rod providing a second axis of rotation about which the single lever is configured to rotate, wherein the first axis differs from the second axis;
wherein, during manipulation of the single lever to control adjustment of the power cable, the condition cable controlling mechanism is configured to prevent adjustment of the condition cable; and
wherein, during manipulation of the single lever to control adjustment of the condition cable, the power cable controlling mechanism is configured to prevent adjustment of the power cable.

5. The system of claim 4, wherein rotation of the single lever about the second rod toward the power cable controlling mechanism releases the cam from engaging the locking pin into the first apertures and the second apertures to permit the single lever to rotate the power arm about the first rod to adjust the power cable.

6. The system of claim 4, wherein rotation of the single lever about the second rod away from the power cable controlling mechanism causes the cam to insert the locking pin through the first apertures and the second apertures to prevent rotation of the power arm, thereby preventing adjustment of the power cable when the single lever rotates about the first rod.

* * * * *